May 10, 1955

C. A. L. RUHL 2,707,867

FLUID LIFT MECHANISM

Filed Dec. 21, 1949

INVENTOR.
Charles A. L. Ruhl,
BY
John P. Smith
Atty.

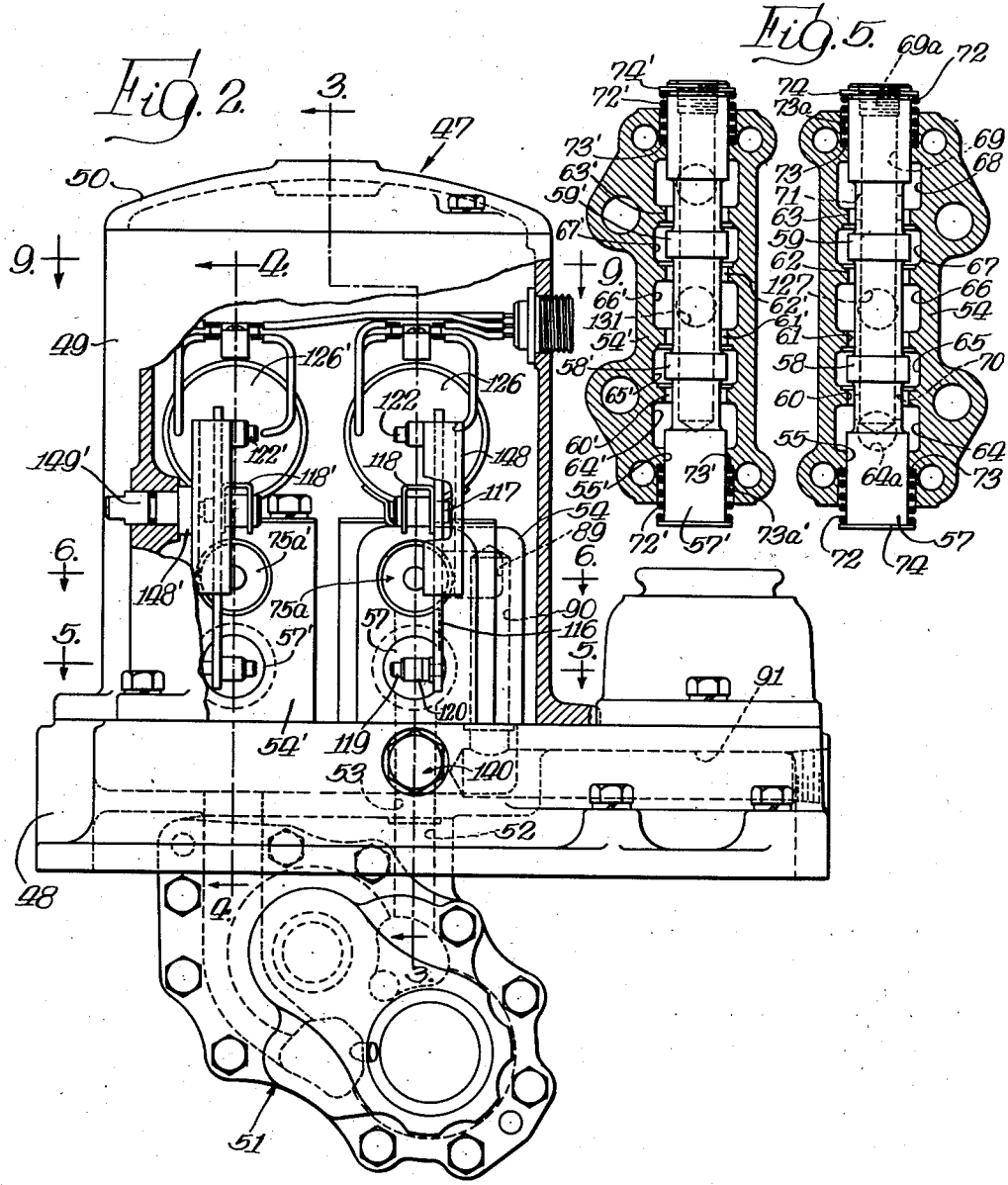

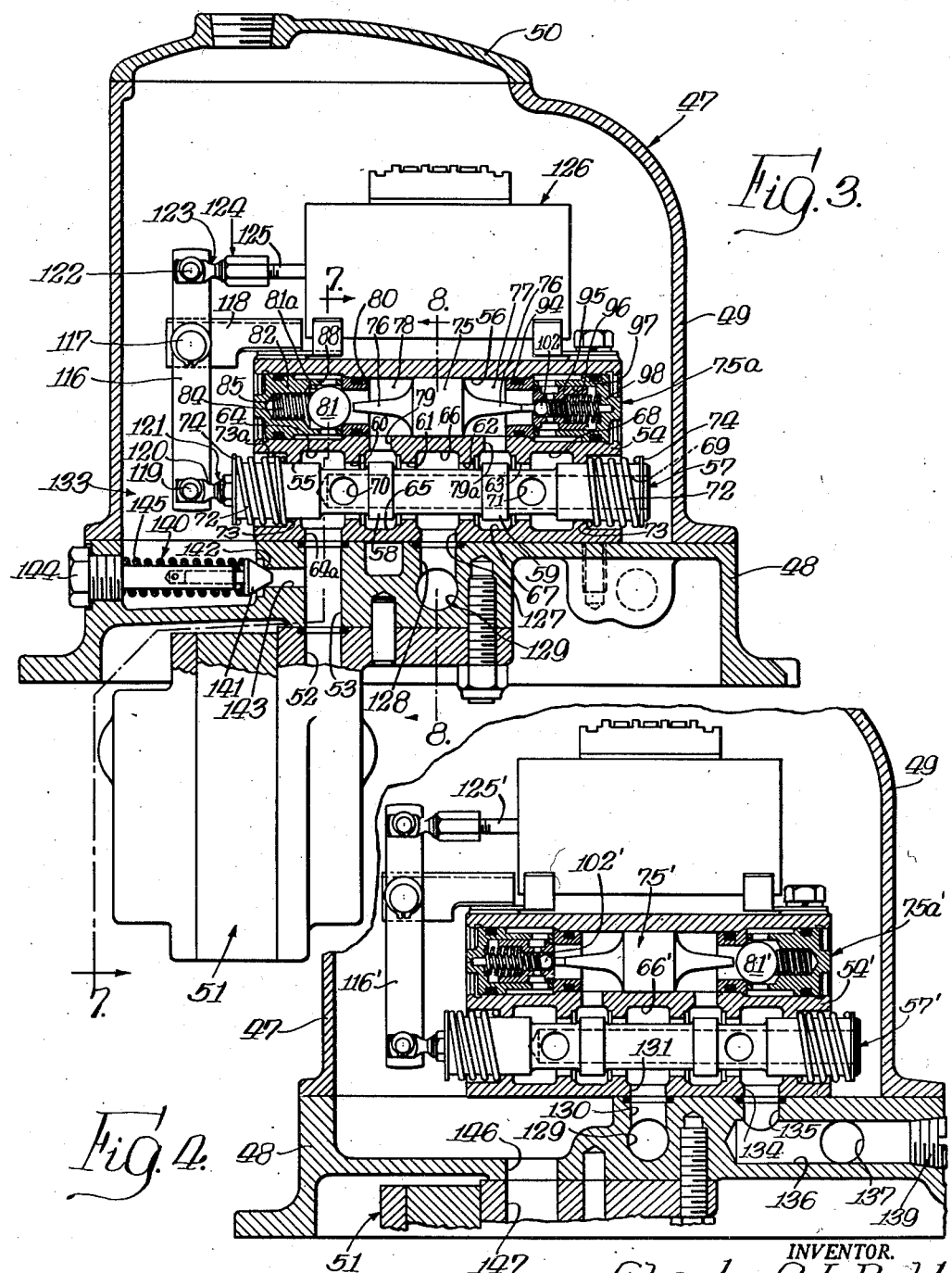

May 10, 1955
C. A. L. RUHL
2,707,867
FLUID LIFT MECHANISM
Filed Dec. 21, 1949
13 Sheets-Sheet 4
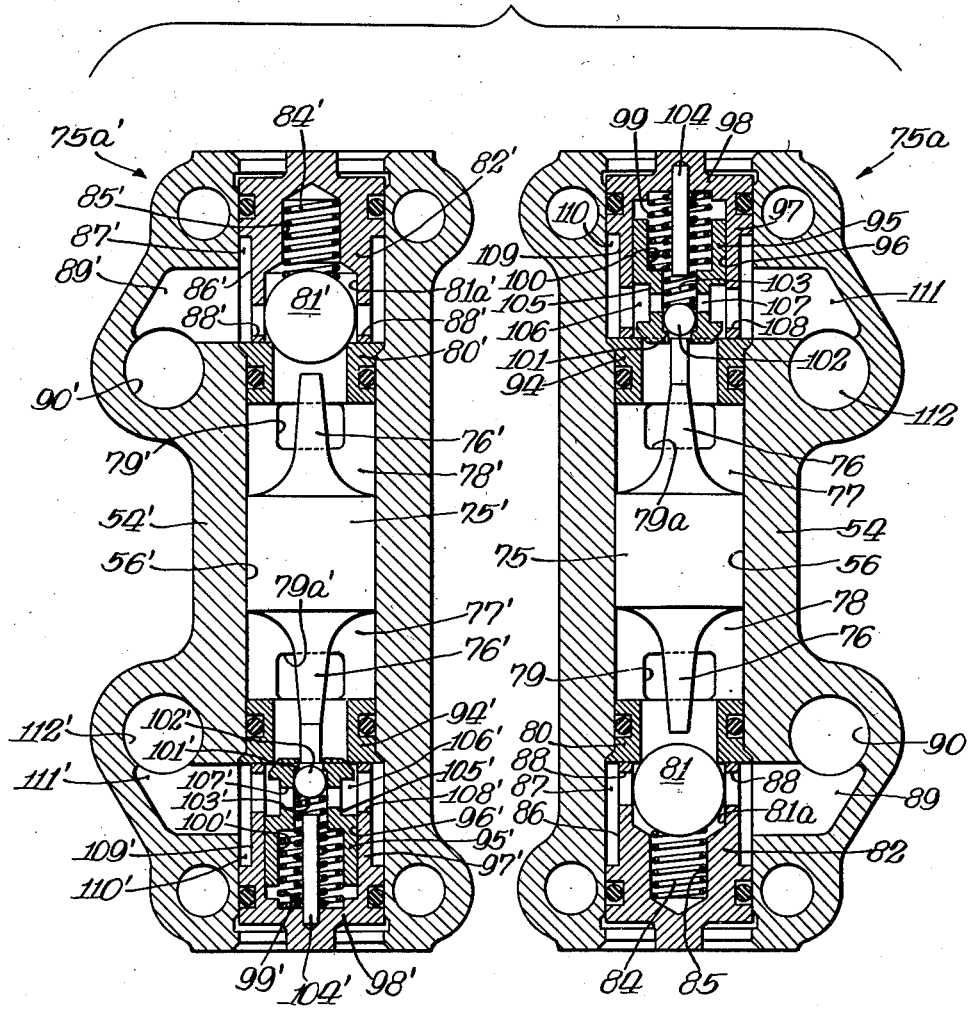
INVENTOR.
Charles A. L. Ruhl,
BY John P. Smith
Atty.

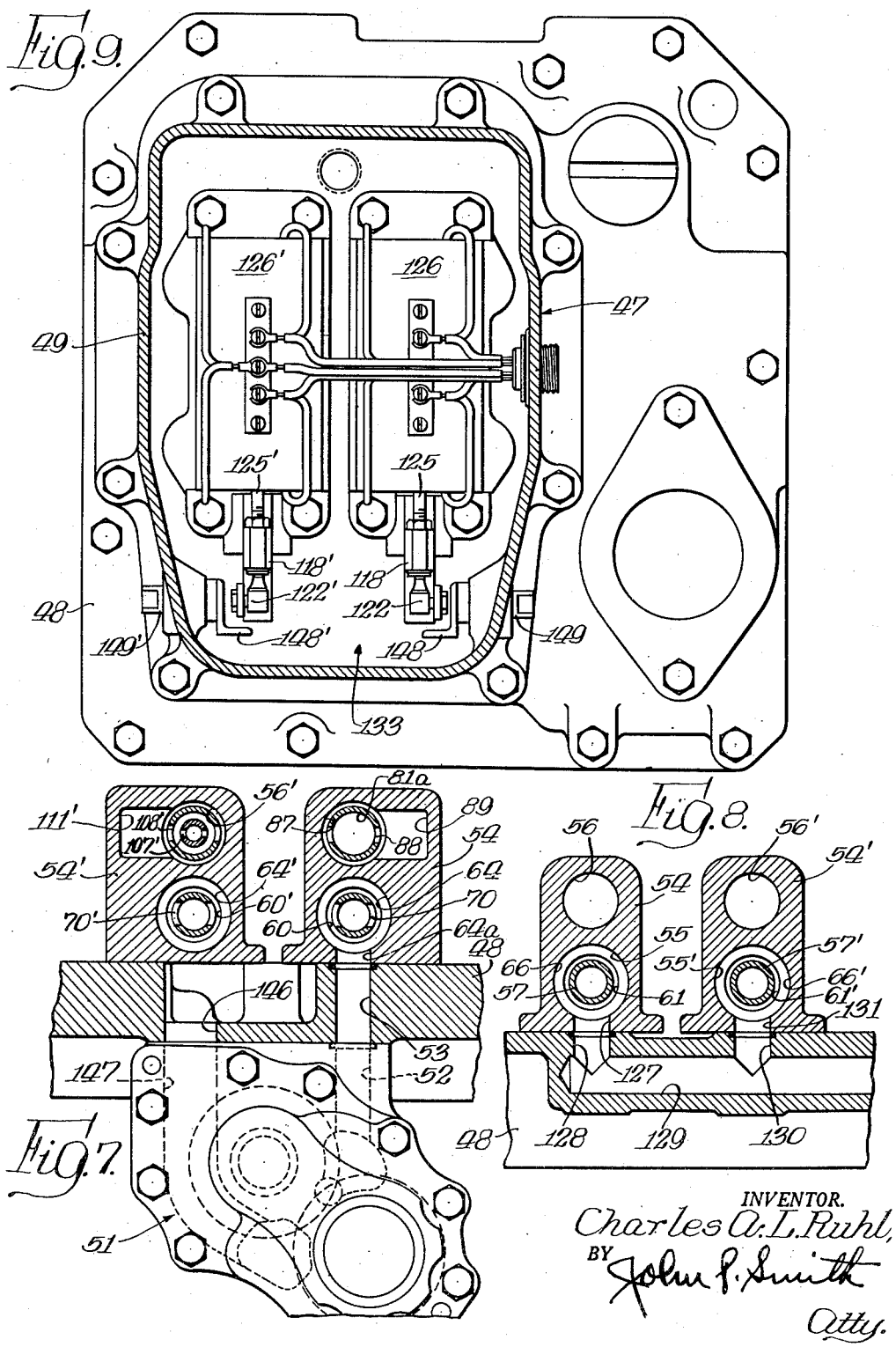

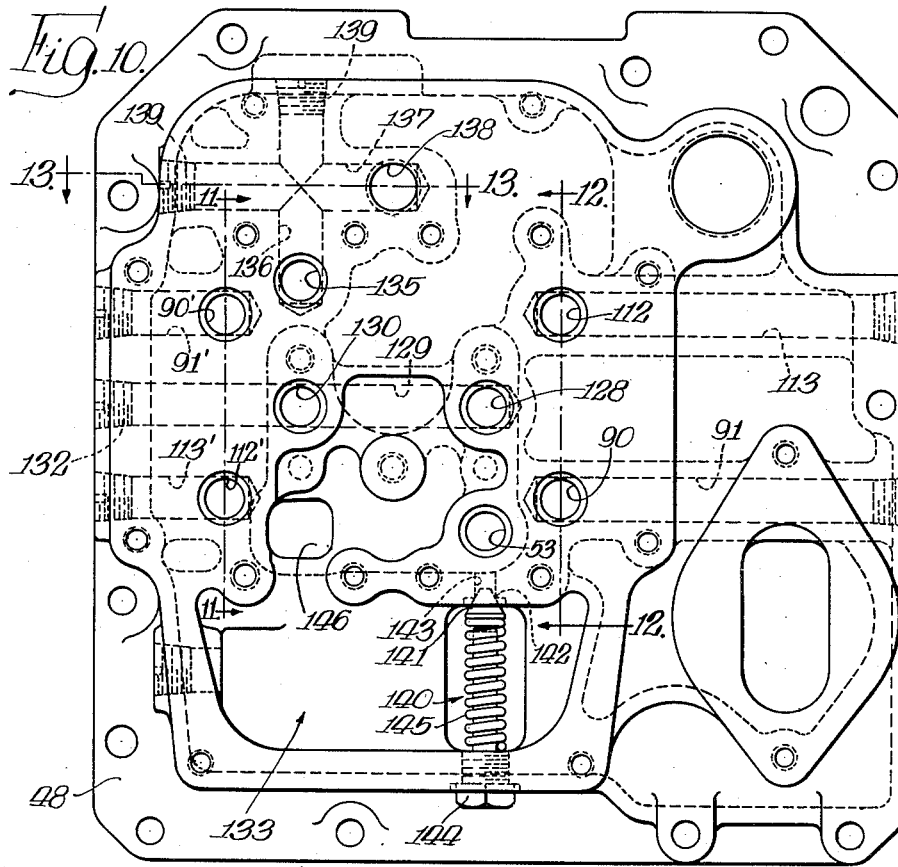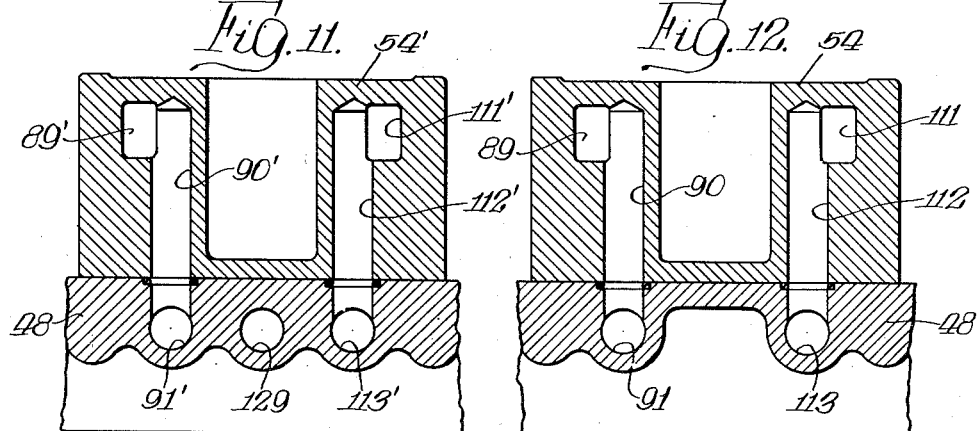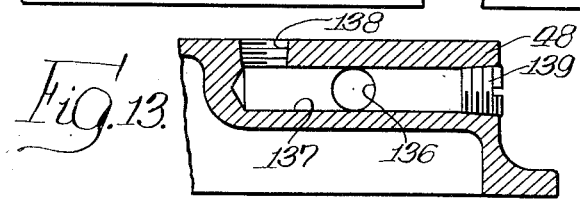

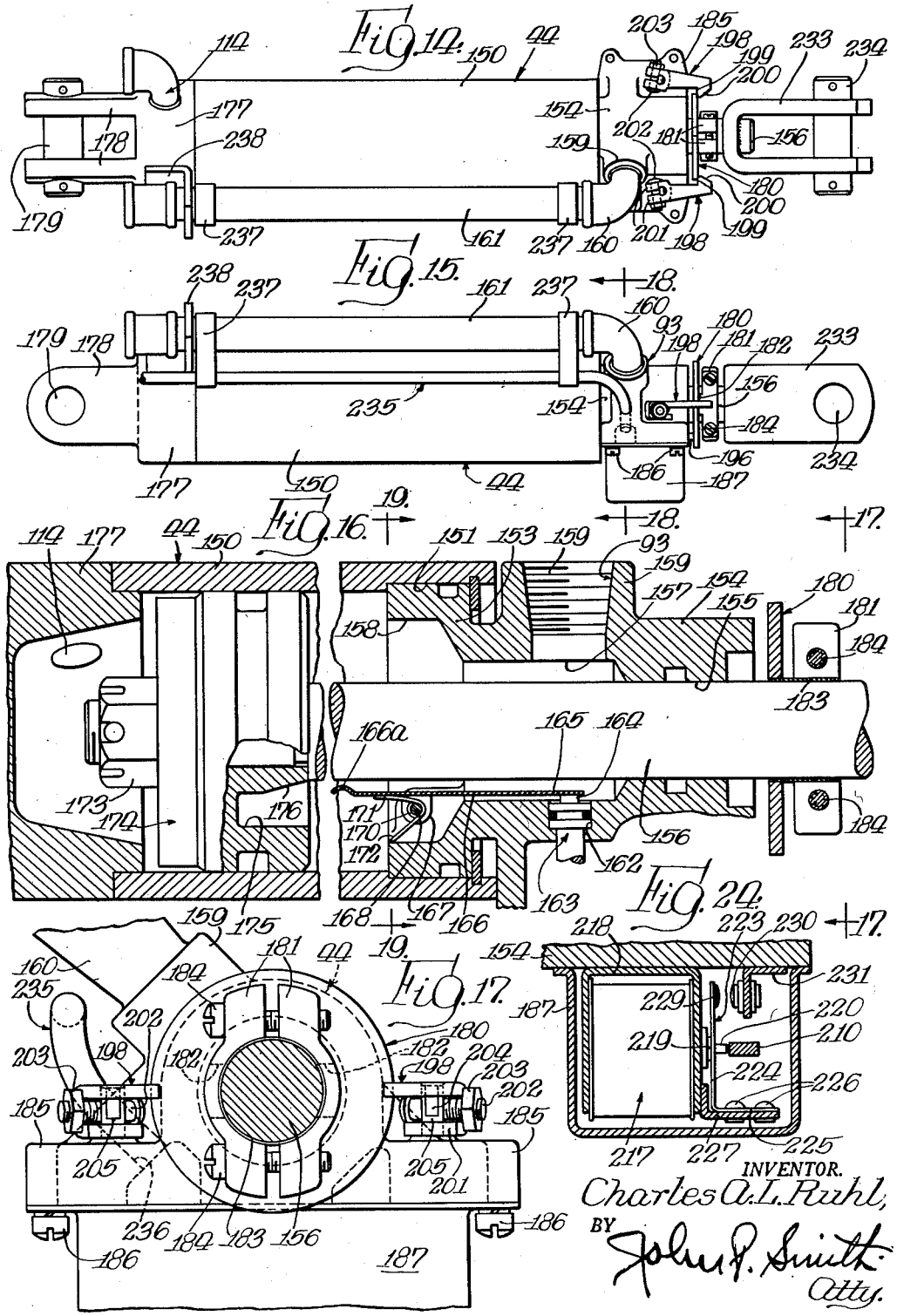

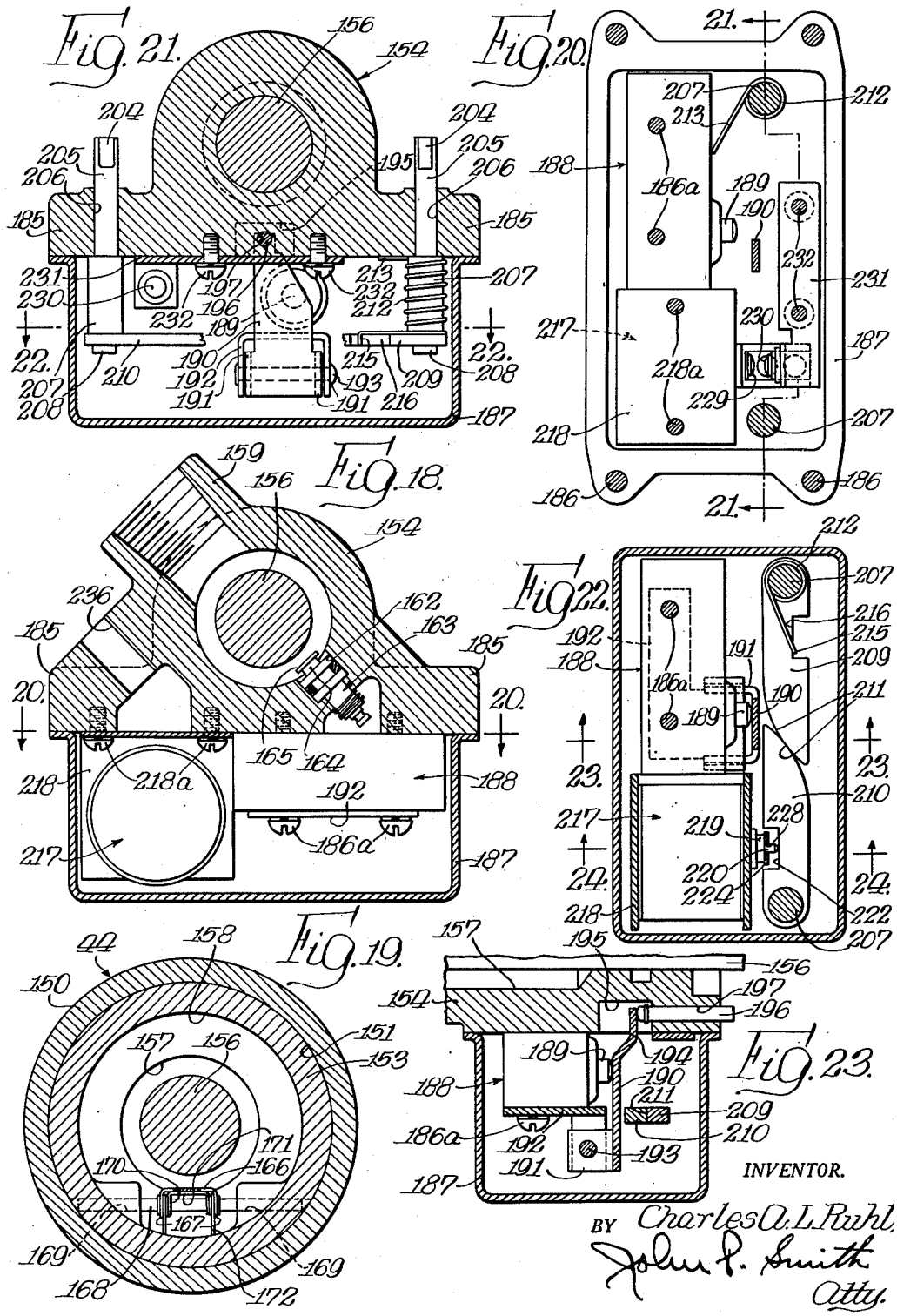

May 10, 1955
C. A. L. RUHL
2,707,867
FLUID LIFT MECHANISM
Filed Dec. 21, 1949
13 Sheets-Sheet 9
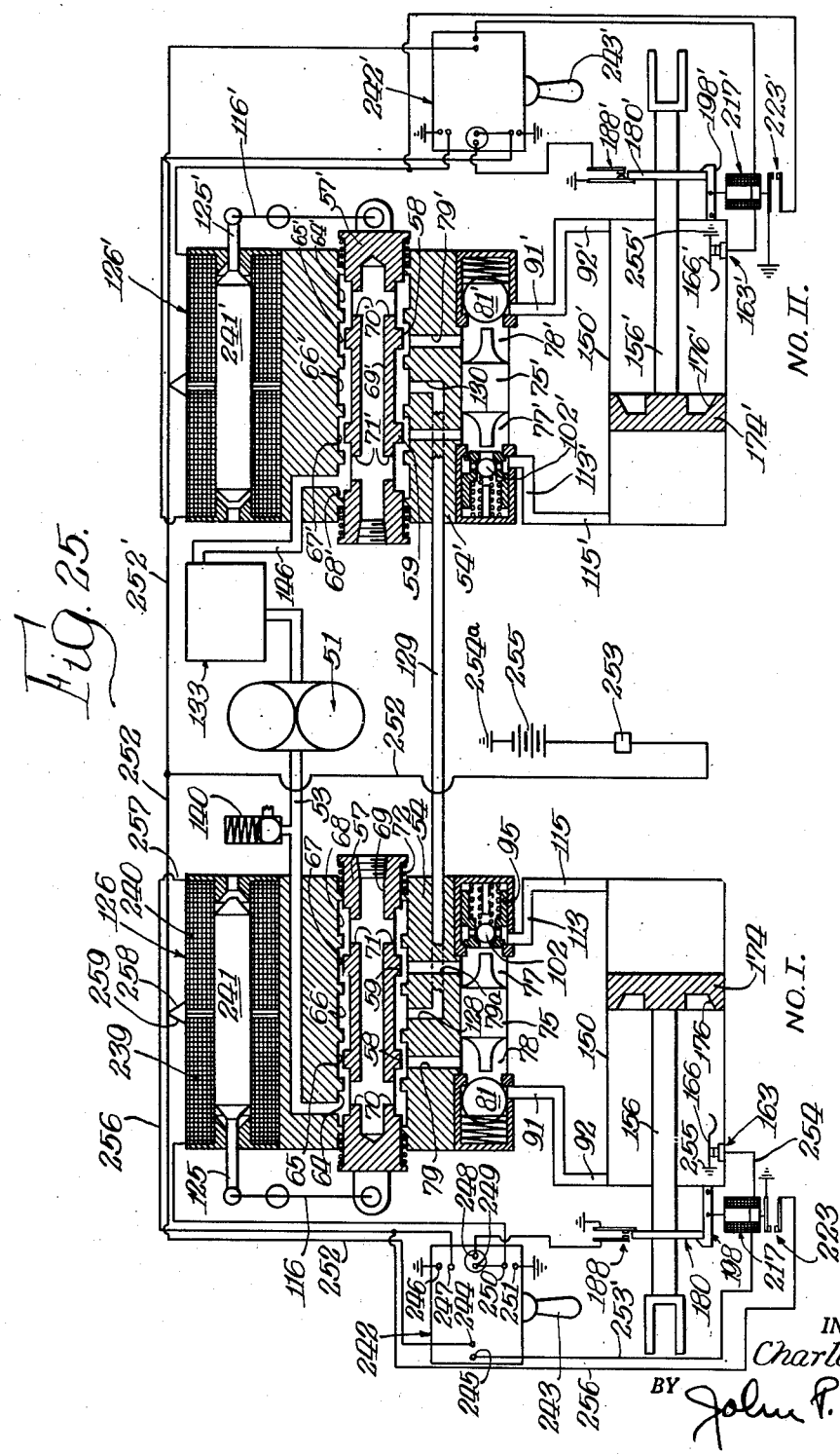
INVENTOR.
Charles A. L. Ruhl,
BY John P. Smith.
Atty.

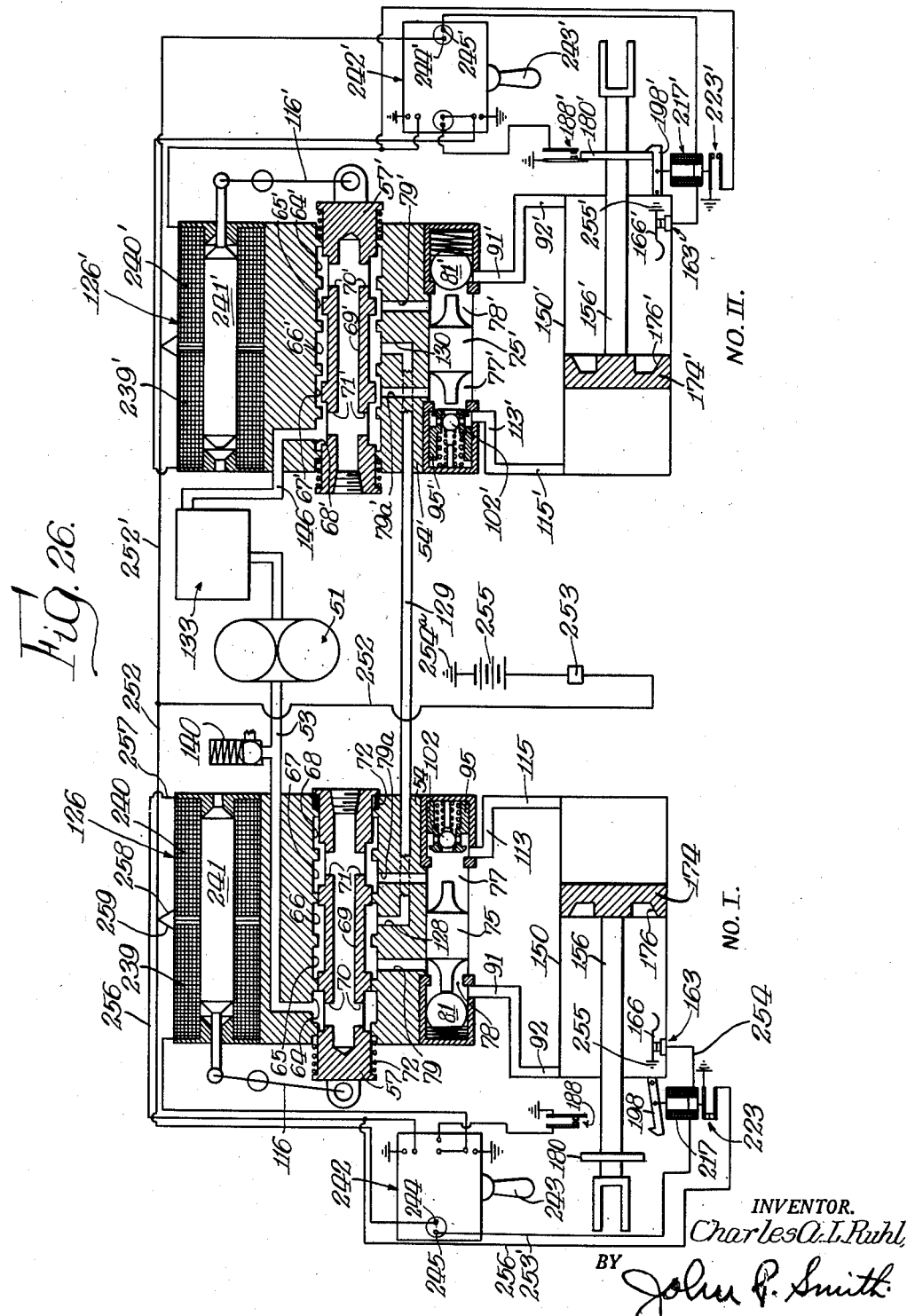

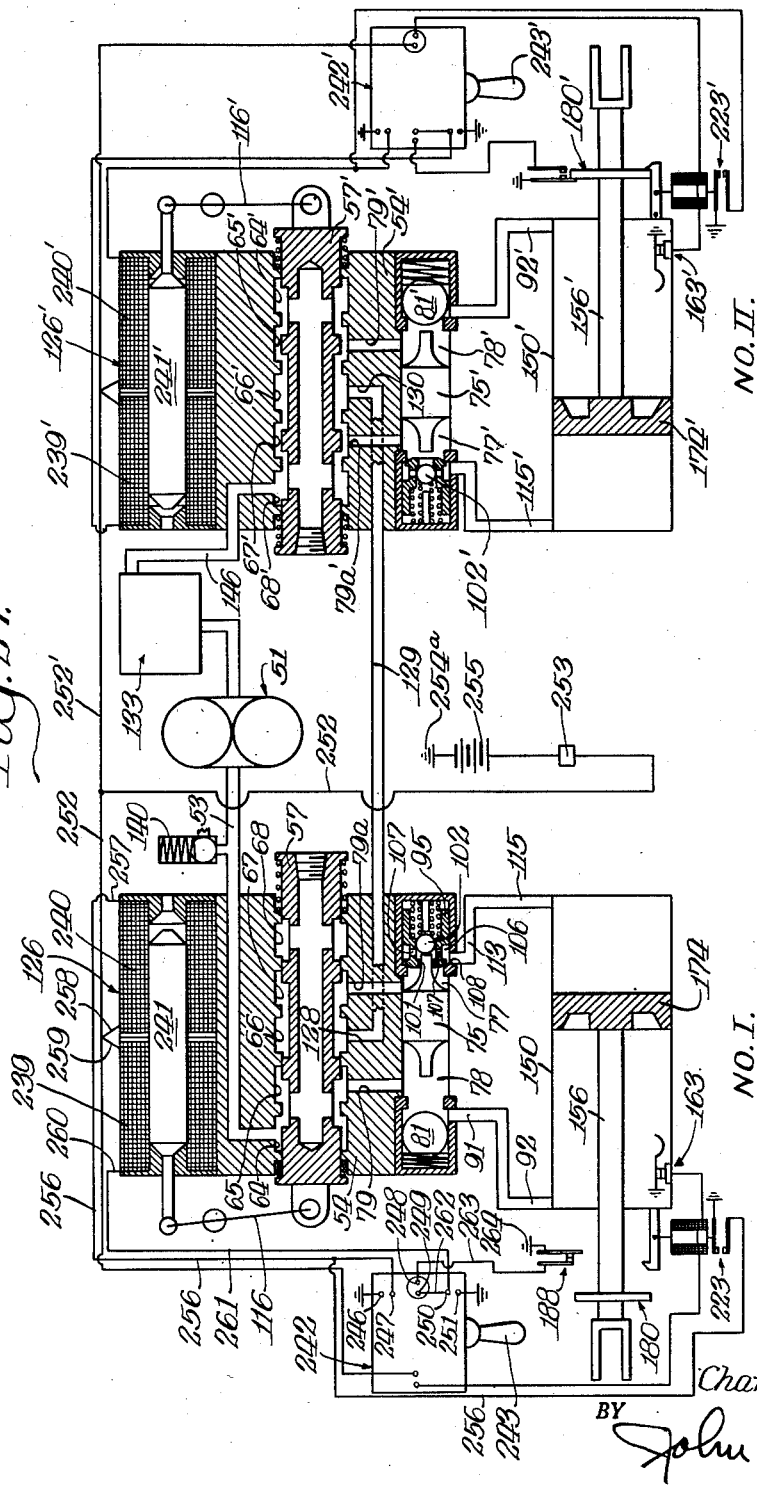

May 10, 1955  C. A. L. RUHL  2,707,867
FLUID LIFT MECHANISM
Filed Dec. 21, 1949  13 Sheets-Sheet 13

INVENTOR.
Charles A. L. Ruhl
BY
John P. Smith
Atty.

United States Patent Office 2,707,867
Patented May 10, 1955

2,707,867

FLUID LIFT MECHANISM

Charles A. L. Ruhl, Charles City, Iowa, assignor to The Oliver Corporation, a corporation of Delaware Application December 21, 1949, Serial No. 134,213

22 Claims. (Cl. 60—97)

The present invention relates generally to a fluid control lift mechanism, but more particularly to a hydraulic lift mechanism having special application for adjusting implements or implement parts attached directly or in trailing relation to or otherwise connected to a tractor in which the extreme or intermediate positions of the implement or implement parts to precise predetermined positions may be secured.

One of the primary objects of the present invention is to provide a novel and improved form of fluid lift mechanism in which electrical circuits selectively control the actuation of the fluid motors or hydraulic cylinder units to their extreme positions and to any predetermined intermediate positions.

A further object of the invention is to provide a fluid operated device as part of a fluid power arrangement which carries an adjustable means for tripping an electrically operated switch mechanism and introduces a predetermined amount of propelling fluid into the device and to cut off the supply of the propelling fluid thereto after a predetermined operation of the device.

A further object of the invention is to provide a fluid operated device in which an electrically controlled and hydraulically actuated means may be visably or predeterminedly set for controlling the extent of the movement of the fluid operated device. After such predetermined setting, other electrical controls permit the fluid operated device to operate between its extended position and the intermediate set position.

A further object of the invention is to provide a fluid operative device in which two or more separate selector valve mechanisms are connected in series from a fluid pump to one or more fluid motors to separately or simultaneously (or only partially) actuate one or more fluid operated devices.

A further object of the invention is to provide a fluid operative device in which two or more separate selector valve mechanisms are connected from a fluid pump to two or more fluid motors, so that the motors may be selectively connected in series for extending one motor while simultaneously contracting the other, or extend or contract both fluid motors simultaneously.

A still further object of the invention is to provide a fluid operated device as part of a fluid power arrangement which includes novel valve mechanisms and an electrically controlled mechanism, the latter of which mechanisms controls the introduction of propelling fluid into the device and is operable to automatically control the device to cut off the supply of propelling fluid thereto after a predetermined operation of the device.

A still further object of the invention is to provide a fluid operated device in which two hydraulically operated cylinder units may be employed for simultaneously or independently raising or lowering earth working tools (such, for example, as cultivating shovels or the like) located on the opposite sides of the tractor, and having associated therewith an electrically controlled system for controlling the operation of said units. The electrically control system of this hydraulic device can also accomplish the following additional functions:

(1) Raise one implement on one side of the tractor while simultaneously lowering the other implement.

(2) Lower both implements simultaneously and simultaneously set the tools for predetermined and/or different earth working depth penetration.

(3) Raise both implements simultaneously and simultaneously set the tool for predetermined and/or different earth working depth penetration.

(4) Lock one fluid cylinder unit while permitting the other cylinder unit to operate separately to actuate movable elements on an implement trailing or otherwise connected to the tractor.

These and other objects are accomplished by providing a construction and an arrangement of the various parts in the manner hereinafter described and particularly pointed out in the appended claims.

Referring to the drawings:

Fig. 2 is an enlarged rear elevational view showing the casing partly in cross section which houses the valves, solenoids and associated mechanisms;

Fig. 3 is an enlarged cross sectional view taken on the line 3—3 in Fig. 2;

Fig. 4 is an enlarged fragmentary cross sectional view taken on the line 4—4 in Fig. 2;

Fig. 5 is an enlarged fragmentary cross sectional view taken on the line 5—5 in Fig. 2, showing the selector valves;

Fig. 6 is an enlarged fragmentary view taken on the line 6—6 in Fig. 2, showing the interlocking valves;

Fig. 7 is an enlarged fragmentary view taken on the line 7—7 in Fig. 3;

Fig. 8 is an enlarged fragmentary view taken on the line 8—8 in Fig. 3;

Fig. 9 is an enlarged top plan cross sectional view taken on the line 9—9 in Fig. 2;

Fig. 10 is an enlarged top plan view of the base plate which supports the valve mechanism etc.;

Fig. 11 is an enlarged fragmentary cross sectional view taken on the line 11—11 in Fig. 10;

Fig. 12 is an enlarged fragmentary cross sectional view taken on the line 12—12 in Fig. 10;

Fig. 13 is an enlarged fragmentary cross sectional view taken on the line 13—13 in Fig. 10;

Fig. 14 is an enlarged top plan view of the fluid motor or hydraulic cylinder unit;

Fig. 15 is an enlarged side elevational view of the same;

Fig. 16 is an enlarged fragmentary and longitudinal cross sectional view of the fluid cylinder unit;

Fig. 17 is an enlarged fragmentary cross sectional view taken on the line 17—17 in Fig. 16;

Fig. 18 is an enlarged fragmentary cross sectional view taken on the line 18—18 in Fig. 15;

Fig. 19 is an enlarged cross sectional view taken on the line 19—19 in Fig. 16;

Fig. 20 is an enlarged cross sectional view taken on the line 20—20 in Fig. 18;

Fig. 21 is an enlarged fragmentary cross sectional view taken on the line 21—21 in Fig. 20;

Fig. 22 is an enlarged cross sectional view taken on the line 22—22 in Fig. 21;

Fig. 23 is an enlarged fragmentary cross sectional view taken on the line 23—23 in Fig. 22;

Fig. 24 is an enlarged fragmentary cross sectional view taken on the line 24—24 in Fig. 22;

Fig. 25 is a diagrammatic view of the complete operative structure of all the valves and fluid cylinders, together with the electrical circuits for controlling the valves. In this view, the selector valves are connected in series and all the circuits are opened and both fluid pressure cylinders are locked;

Figure 29:
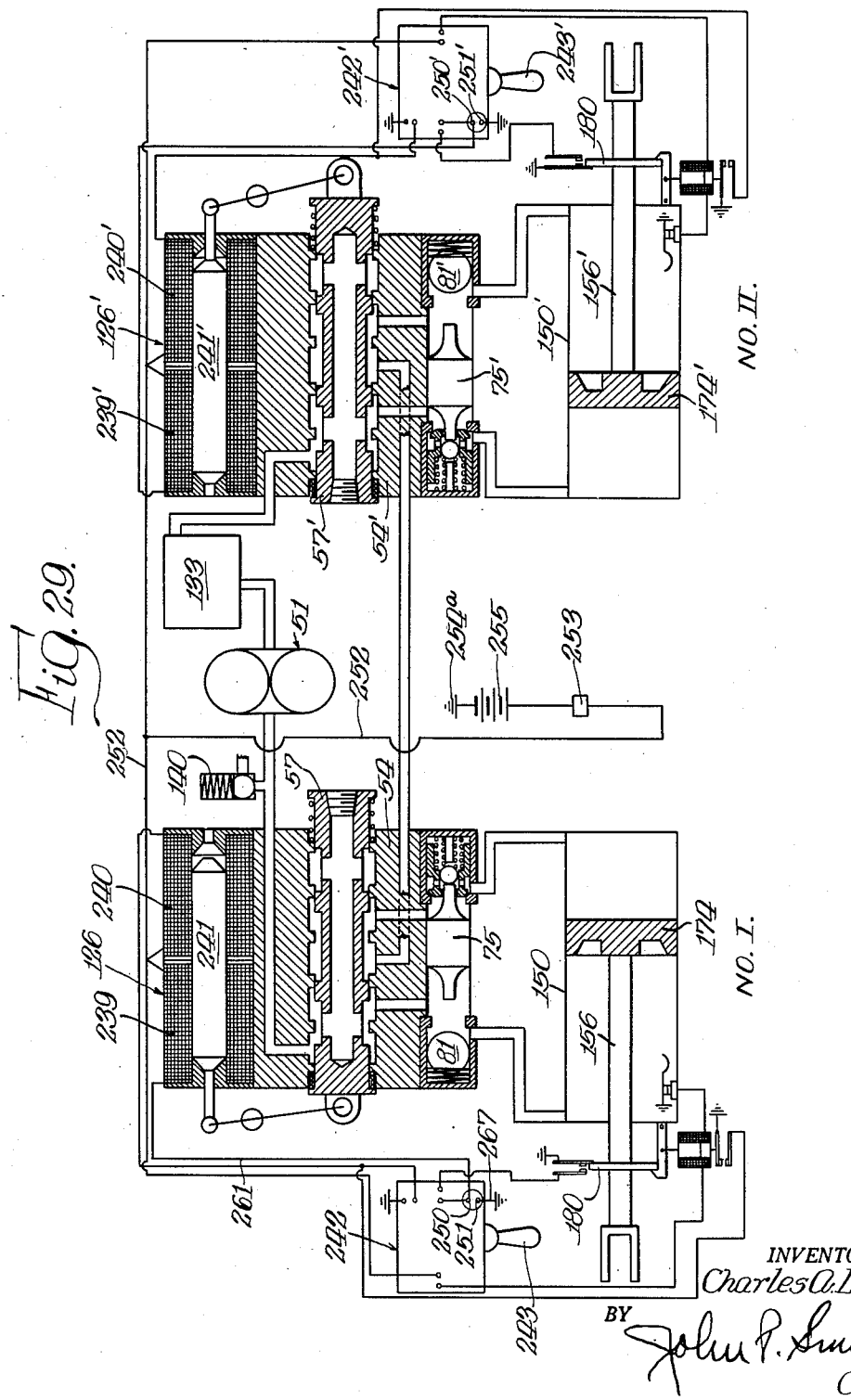

Fig. 26 is a similar diagrammatic view showing No. I fluid pressure cylinder raising or extending with No. II fluid pressure cylinder locked. In this view No. I hand switch is moved to a certain position to close the primary circuit which, in turn, energizes a solenoid switch to close a secondary circuit;

Fig. 27 is a similar diagrammatic view showing No. I fluid pressure cylinder unit lowering or contracting and No. II cylinder unit locked. In this view No. I hand switch is moved to a second position to close a primary circuit to energize another solenoid to actuate the selector valve;

Fig. 28 is a similar diagrammatic view showing fluid cylinder units Nos. I and II connected in series and raising or extending simultaneously. In this view No. I hand switch is moved to a third position to close the primary circuit and No. II hand switch is moved a corresponding position to close a corresponding primary circuit to actuate simultaneously both selector valves; and Fig. 29 is a similar diagrammatic view showing No. I and No. II fluid pressure cylinder units lowering or contracting simultaneously with both cylinder units connected in series.

In illustrating one adaptation of my improved electrically controlled fluid lift mechanism, I have shown the same in connection with conventional tractor mounted earth working tools, in the form of a pair of sets of cultivating shovels mounted on the opposite sides of the longitudinal frame of the tractor.

In this particular adaptation, separate fluid cylinders are employed to raise and lower or adjust the separate tool sets independently or simultaneously for depth penetration. It will, of course, be understood that this fluid power arrangement is equally adaptable for the use of one of the fluid cylinders, or both for the adjustment of implement parts of implements trailing or otherwise attached to or associated with the tractor.

Figure 1:
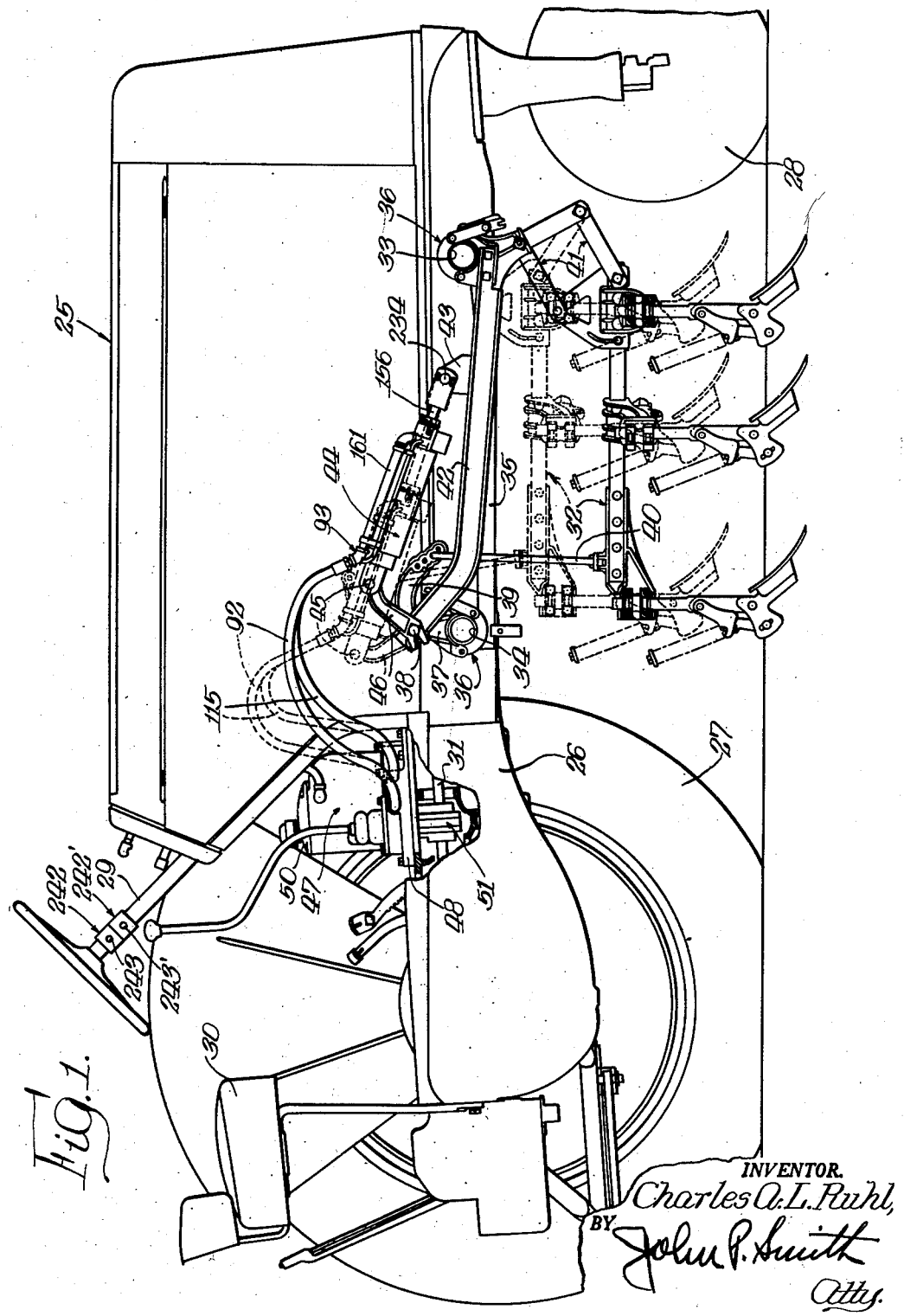
Fig. 1 is a side elevational view of a conventional tractor and implement showing one adaptation of my improved fluid control lift mechanism.

In Fig. 1 of the drawings, a conventional type of tractor is designated by the reference character 25. The tractor in this instance is provided with the usual main frame 26, rear traction wheels 27 and front steering wheels 28. The tractor is also provided with the usual steering column 29, operator's seat 30 and continuously driven power take-off shaft 31 located within the transmission housing, of the tractor main frame 26. Implements in the form of separate pairs or sets of cultivating shovels, generally indicated by the reference character 32, are arranged on the opposite sides of the tractor. The supporting structure for mounting these implements include front and rear transversely extending beams or pipes 33 and 34 respectively, secured to the tractor frame and longitudinally extending implement frame members 35. These members have their opposite ends secured to the conventional type clamp brackets generally indicated by the reference character 36 which clamp the brackets and members to the beams 33 and 34. Secured to the rear beam 34 is an upwardly extending bearing bracket 37 in which is journaled a rock shaft 38. Secured to the rock shaft 38 is a forwardly curved crank arm 39 (only one set of tools of which is shown in the drawing) which has its outer end connected by a link 40 to one of the cultivating beams 32. The front ends of the cultivating beams 32 are pivotally suspended from the front beam 33 by the usual parallel link arrangement, generally indicated by the reference character 41 in the manner well understod in the art. A longitudinally extending member 42 has its forward end secured to the clamp bracket 36 and its rear and upwardly curved end embracing the rock shaft 38. Secured adjacent the front end of the member 42 is an upwardly extending lug or arm 43 to which is pivotally attached the rod end of a fluid motor or hydraulic cylinder unit. The fluid motor or hydraulic cylinder unit is generally indicated by the reference character 44 and also designated as cylinder No. I. The other end of the cylinder unit 44 is pivotally connected, as shown at 45, to a crank 46 which is secured to the rock shaft 38. The details of the construction of the cylinder unit 44 will hereinafter be more fully described.

*Selector valve mechanism*

The fluid power system and valve mechanism will next be described.

The selector valves, the interlocking valves, the solenoids for both fluid motors, the fluid reservoir and most of the associated parts are all contained in a casing or housing, generally indicated by the reference character 47. The housing 47 as a unit, is adapted to be seated in an opening in and secured to the top of the tractor transmission housing of the tractor frame 26 in the manner clearly illustrated in Fig. 1 of the drawings. This unit assembly or housing includes a base plate 48 which is secured to the transmission housing of the tractor frame 26 in the manner clearly illustrated in Fig. 1 of the drawings. A housing or shell 49 embraces the valve mechanism and is secured to the plate 48 and a removable cap 50 is secured to the shell 49. Secured to the bottom side of the plate 48 and located within the transmission housing 26 of the tractor is a conventional fluid pressure rotary pump, generally indicated by the reference character 51, which, in turn, is continuously driven by the power take-off shaft 31 of the tractor. The outlet or fluid pressure side of the pump, as shown at 52 communicates with a vertical fluid pressure line 53 in the plate 48. Positioned over the fluid pressure passageway 53 is a longitudinally extending selector valve and interlock valve block or casing 54 having two vertically spaced apart horizontal valve bores 55 and 56 extending parallel therethrough. Reciprocally mounted in the valve bore 55 is a selector valve 57. The selector valve 57 is provided with longitudinally spaced apart lands 58 and 59 which are adapted to cooperate with the respective annular flanges 60, 61, 62 and 63 in the manner well understood in the art for controlling the passage of fluid therethrough. Located between the annular flanges 60, 61, 62 and 63 are annular fluid recesses 64, 65, 66, 67 and 68 for permitting the passage of fluid through and around the valve member 57 in the manner hereinafter more fully described. The fluid pressure line 53 communicates with the annular fluid chamber 64 through a vertical aperture or inlet port 64ᵃ in the valve casing 54. (See Figs. 3, 4 and 5 of the drawings.) Extending longitudinally through the valve member 57 and terminating adjacent one end thereof is a bore 69 which is closed by a plug 69ᵃ. Extending diametrally through and communicating with the bore 69 at points outside the lands 58 and 59 are transverse apertures 70 and 71 respectively. The selector valve 57 is maintained or returned to central or balance position, as shown in Figs. 3, 4 and 5 of the drawings (or in which the fluid cylinder is locked) by oppositely disposed springs 72 embracing the outer ends of the valve member 57. The inner ends of these springs 72 engage shoulders 73 formed in the adjacent outer end recesses 73ᵃ of the valve casing 54 in the bore 55. The outer ends of the springs are retained on the valve member 57 by suitable washer 74.

In order to simplify the understanding and operation of the present invention, one fluid cylinder assembly is generally designated as No. I and the other cylinder assembly as No. II. (See diagrammatic views.) The selector valve, the interlock valve, the solenoids, the switches, the four-way hand switch and all the various parts which directly control or directly cooperate with fluid cylinder assembly No. II carry the same reference characters as fluid cylinder assembly No. I parts with the addition of a prime (') to the reference characters.

Interlock valve mechanism

Reciprocally mounted in the longitudinally extending bore 56 of the valve casing 54 is a fluid actuated interlock valve mechanism, generally indicated by the reference character 75a, which includes a reciprocally fluid actuated plunger 75. (See Fig. 6 of the drawings.) This plunger 75 consists of a central barrel portion and oppositely disposed tapered portions 76 forming in effect fluid chambers 77 and 78 on the opposite sides of the plunger. The chamber 78 communicates with the annular fluid pressure chamber 65 through an aperture or fluid passage port 79 in the valve casing 54. In a similar manner the chamber 77 communicates with the annular chamber 67 by a passageway or fluid passage port 79a. Located at one end of the valve casing 54 and secured in the valve bore 56 by suitable sealing and securing means, is a valve ring or seat 80. Mounted on the valve seat 80 is a ball valve member 81. The ball 81 is loosely mounted in a cylindrical recess 81a located in one end of a sleeve 82. The ball 81 is normally pressed against its seat 80 by a compression spring 84, which, in turn, is mounted in a socket 85 in the sleeve 82. The ball valve 81 is adapted to be unseated by one of the tapered ends 76 of the plunger 75 in the manner hereinafter described. The inner portion of the sleeve 82 has a reduced diametral portion 86 forming an annular fluid chamber 87 therearound. Diametral apertures 88 in the reduced wall 86 of the sleeve 82 permit fluid to pass from the chamber 78 to a fluid chamber 89 in the casing 54 when the ball valve 81 is unseated. (See Figs. 3, 6 and 12 of the drawings.) The chamber 89 communicates with a vertical fluid passageway 90 in the valve casing 54. The passageway 90 communicates with a horizontal passageway 91 in the plate 48. The passageway 91 communicates by means of a conduit or flexible hose 92 to rod end, generally indicated as shown at 93, of fluid cylinder unit 44 or cylinder unit No. I. (See Figs. 1, 14, 15 and 16 of the drawings.) Secured and sealed in a manner well understood in the art, to the other end of the interlock valve casing 54 in the bore 56 is a valve mechanism which includes a ring or valve seat 94. Reciprocally mounted and adapted to seat on the valve seat 94 is a valve sleeve member 95. (See Figs. 3 and 6 of the drawings.) The valve member 95 is reciprocally mounted in a cylindrical recess 96 of a cup-like sleeve 97 which is sealed in the bore 56 and secured to the casing 54 in the manner well understood in the art. The sleeve 97 is closed at its outer end, as shown at 98. The valve member 95 is normally pressed on its seat 94 by a spring 99 mounted within a cylindrical socket 100 in the sleeve valve member 95. The inner end of the sleeve valve member 95 is provided with a valve seat 101 on which is seated a restricter ball valve member 102. The ball 102 is normally pressed against its seat by a spring 103 which is mounted within the spring 99 and surrounds an inwardly projecting pin 104 secured to and centrally of the closed end 98 of the cup sleeve 97. The sleeve valve member 95 has a reduced diametral portion 105 adjacent its inner end forming an annular fluid chamber 106 therearound. Located in the opposite sides of the reduced portion 105 are relatively small apertures 107 through which the fluid chamber 77 is adapted to communicate with the annular chamber 106 when the ball valve 102 is unseated by one of the tapered portions 76 of the plunger 75. This movement of the plunger 75 in this direction to unseat the ball valve 102 occurs when differential fluid pressure is exerted in the chambers 77 and 78 to contract the fluid cylinder unit No. I in the manner hereinafter described.

In substantial alignment with the apertures 107 are relatively larger apertures 108 located in the opposite sides of the sleeve 97. The sleeve 97 has a reduced diametral portion 109 forming an annular fluid chamber 110 therearound which communicates with the apertures 107 and with an offset fluid pocket or chamber 111 in the valve casing 54. The chamber 111 communicates with a vertical fluid passageway 112 in the casing 54 which, in turn, communicates with a horizontal passageway 113 in the base plate 48. The passageway 113 is connected to and communicates with the piston end, generally indicated by the reference character 114, of the fluid cylinder unit 44 or No. I cylinder unit, through the medium of a conduit or flexible hose 115. (See Figs. 1, 10, 12, 14 and 16 of the drawings.) Suitable snap rings (not shown) are positioned in the ends of both valve bores to hold the interlock assemblies in the valve body.

From the above description, it will be understood that when fluid pressure occurs in chamber 77 in interlock valve No. I, the plunger 75 is actuated downwardly, as viewed in Fig. 6 of the drawings. This pressure unseats the sleeve valve 95 from its seat 94 (and carries with it the ball valve 102) to permit the fluid pressure to pass from the chamber 77 through the communicating passages 111, 112, 113, conduit 115 to the piston end of the fluid cylinder No. I to actuate or extend the piston therein. Simultaneously with this operation, the other tapered end 76 of the plunger 75 actuates or unseats the ball valve member 81 to permit the fluid to return from the rod end of the fluid cylinder through the hose 92, passageways 91, 90 to the valve chamber 78, from where it may be either returned to the reservoir through a selector valve of No. II cylinder unit or through this selector valve to fluid cylinder unit No. II in the manner hereinatfer more fully described.

The selector valve 57 is actuated by a lever 116 which is pivoted intermediate its ends, as shown at 117 to a rearward extending bracket 118 secured to the top side of the valve casing 54. The lower end of the lever 116 is pivotally connected, as shown at 119, to a connecting member 120. The inner end of the connecting member 120 is connected to a conventional ball and socket connection, generally indicated by the reference character 121. The forward end of the ball and socket connection is secured to the rearward end of the selector valve member 57 as shown in Fig. 3 of the drawings. The upper end of the lever 116 is pivotally connected, as shown at 122, to a connecting member 123 which, in turn, is connected by a conventional ball and socket connection, generally indicated by the reference character 124. The forward end of the ball and socket connection 124 is secured to a reciprocating rod 125. The rod 125 extends into and is reciprocated by a conventional solenoid mechanism mounted within a casing generally indicated by the reference character 126. The solenoid is mounted on top of and secured to the valve casing 54. The details of construction and function of operation of the solenoid mechanism in connection with the electrical control will hereinafter be more fully descriebd.

The selector valve, the interlock valve, the solenoid mechanism, and all the operating parts associated therewith for operating fluid cylinder unit No. II, which are identical in construction and function of operation with the corresponding parts for the operation of fluid cylinder unit No. I, are indicated with corresponding reference numerals, except that each character reference for No. II parts carry a prime (') indicium.

The fluid pressure chamber 66 of the selector valve No. I is in continuous communication with fluid pressure chamber 66' of selector valve No. II through a vertical aperture or fluid outlet port 127 in the valve casing 54, which communicates with a vertical passageway 128 in the base plate 48. (See Figs. 3 and 8 of the drawings.) Communicating with the passageway 128 is a horizontal passageway 129 in the plate 48, which, in turn, communicates with a vertical passageway 130 in the plate 48. The passageway 130 communicates with an aperture 131 in the valve casing 54' which, in turn, communicates with the fluid chamber 66' of the selector valve No. II. (See Figs. 3, 4, 8 and 10 of the drawings.) The outer end of passageway 129 is closed by a suitable threaded plug 132. The outlet end of selector valve of cylinder unit No. II through which the fluid is returned to the reservoir (the reservoir is generally indicated by the reference character 133 and located within the housing 47 above the base plate 48), includes a vertical aperture 134 in the valve casing 54' which communicates with an aligned aperture 135 in the base plate 48. The aperture 135 communicates with a horizontal passageway 136 in the plate 48. A second transverse passageway 137 in the plate 48 communicates with the passageway 136. The inner end of the passageway 137 communicates through an aperture 138 with the reservoir 133. The outer ends of each of the passageways 136 and 137 are closed by suitable threaded plugs 139. A fluid pressure relief valve, generally indicated by the reference character 140 is provided in the fluid pressure line or passageway 53, which includes a tapered valve member 141 seated on a valve seat 142 of a passageway 143 communicating with the fluid pressure line 53. The shank of the valve member 141 is reciprocally mounted in a longitudinal recess on the inner end of a bolt-like member 144 secured in a threaded aperture in the plate 48. The valve member 141 is normally urged against its seat by a spring 145 mounted on and surrounding the reduced portion of the bolt 144. The fluid from the reservoir 133 passes through an aperture 146 in the base plate 48 to the return or inlet side 147 of the pump 51. Manual means in the form of a crank 148 is secured to a shaft 149 journaled in the casing 47 is operable to engage and actuate the lever 116 in the event of failure of the electrically controlled means hereinafter described. (See Fig. 9.)

From the above description it will be understood that when both selector valves are in their neutral or central position, or the positions shown in Figs. 3, 4, 6 and 7 of the drawings, the fluid pressure from the pump 51 will flow into the fluid chambers 64, 65, 66, 67 and 68 surrounding selector valve No. I and from there through passageway 129 to the fluid chambers 64', 65', 66', 67' and 68' surrounding selector valve No. II and then be returned from the last named chambers through the passages 136 and 137 to the reservoir 133. When this is occurring, both fluid cylinder units will be locked as will hereinafter be more fully described.

*Fluid motor or cylinder unit*

The fluid power motor or hydraulic cylinder unit 44 comprises a longitudinal shell or tube 150. (See Fig. 16 of the drawings.) Secured in an annular recess 151 in one end of the tube 150 is a cylindrical portion 153 of a head 154. The head 154 is provided with longitudinal bore 155 in which a reciprocating piston rod 156 is mounted. Located in the intermediate portion of the head is an enlarged annular recess 157 which terminates in a relatively larger annular recess 158. The annular recess 157 communicates with passageway 93 in the form of an internal threaded socket 159 formed integrally with the head 154. A threaded elbow 160 mounted in the socket 159 and a connecting pipe 161 secured to the cylinder 44 forms the communicating connections to the flexible hose 92. (See Figs. 1, 14, 15 and 16 of the drawings.) Mounted in a radially extending recess 162 in the head 154 is a reciprocally actuated switch, generally indicated by the reference character 163. The switch 163 is properly sealed in and insulated with respect to the head 154. The switch 163 includes a reciprocally mounted insulated or plastic pin 164, the inner end of which is adapted to be engaged and actuated outwardly to break the contact by one end 165 of a flat switch trip member 166. The intermediate portion of the member 166 has two oppositely and downwardly depending apertured ears 167 for forming a pivot for the member 166 on a shaft or pin 168. The shaft 168 is secured in aligned bores 169 in the head 154 within the annular recess 158. (See Figs. 16 and 19 of the drawings.) The other end of the trip member 166 is arcuately and outwardly curved as shown at 166ª so as to engage a certain portion of the piston to break an electrical circuit when the piston reaches its maximum extended position as will hereinafter be more fully described. The trip member 166 is normally actuated to depress the pin 164 by a spring 170 which has its coiled portions embracing the shaft 168 and its intermediate and free end portions 171 and 172 engaging respectively the member 166 and the inner portion of the head 154. (See Fig. 16 of the drawings.) Secured to the inner end of the piston rod 156 by a nut 173 is a conventional piston, generally indicated by the reference character 174. The piston 174 in this instance is provided with an annular recess 175 which forms a conical or cam-like hub 176 adjacent the rod 156. This cam hub 176 moves in the path of and is adapted to engage the curved end 166ª of the switch trip member 166 to actuate the switch 163 and break a certain circuit when the fluid cylinder unit 44 reaches its extended position. The piston end of the cylinder is enclosed by a closure member 177 which is secured to cylinder tube 150 in any well known manner. Formed integrally with the member 177 are longitudinally extending and laterally spaced apertured ears 178 which support a transverse pin 179 for connecting one end of the fluid cylinder to crank arm 46 of the implement attachment.

One of the important features of the present invention includes a novel means operatively associated with the fluid cylinder which is electrically controlled and hydraulically set or adjusted for regulating the extent or range of movement of the fluid cylinder so that any predetermined range of extension of the cylinder unit may be secured for varying the depth penetration of the earth working tools actuated by the cylinder unit. This novel means includes a switch tripping adjustable disc or collar, generally indicated by the reference character 180. Formed integrally with the disk 180 are oppositely disposed split clamping sections 181 which are connected to the disk by opposite arcuate wall extensions 182. (See Figs. 15, 16 and 17 of the drawings.) Positioned between the clamping sections 181 and the rod 156 is a frictional sleeve 183. Adjustable or tensioning screws 184 extend the opposite portions of the clamp sections 181 so that proper frictional resistance to accidental displacement or movement of the disk 180 on the rod 156 be regulated. In other words, frictional resistance of adjustment or sliding of the disk 180 on the rod 156 should be sufficiently free to permit the disk 180 to move on the rod when the disk is held by certain means hereinafter described.

Formed integrally with the cylinder head 154 are oppositely projecting flanges 185 forming a flat surface or base to which is secured by means of screws 186 a rectangular metal housing 187. Mounted within the housing 187 and secured to the head 154 by screws 186ª is a conventional switch, generally indicated by the reference character 188. The switch 188 is normally spring actuated to closed position, but the contact points thereof are disengaged by a reciprocable pin 189 which, in turn, is actuated or depressed by a lever member 190. One end of the member 190 is provided with two offset spaced apart aligned apertured ears 191 which, in turn, are pivotally attached to a bracket 192 by a pin 193. The bracket 192 is secured to one side of the switch 188 by the screws 186ª. The inner free end of the lever is offset as shown at 194 and extends into a recess 195 in the head 154. The inner end 194 of the lever 190 is located in the path of and is adapted to be engaged by a movable member or a reciprocating tripper pin 196 mounted in a longitudinal bore 197 located in the outer end of the head 154. (See Figs. 15, 21, 22, and 23 of the drawings.) The trip pin 196 projects outwardly of the head 154 and is located in the path of movement of the disk 180 so as to be engaged thereby to break the electrical circuit in which the switch 188 is included. The actuation of the switch 188 by the trip disk 180 to break the switch contacts therein occurs whenever the disk 180 strikes or depresses the trip pin 196. It will, therefore, be obvious that when the disk 180 is adjusted or is set at a predetermined position along the rod 156, that particular position of the disk 180 on the rod 156 will determine the extent of contraction of the fluid cylinder unit.

The trip disk 180 is adjusted along the cylinder rod 156 by having the disk engage one end of the cylinder on the inward stroke of the piston and also adjusted by a pair of oppositely disposed jaws or pawls, generally indicated by the reference character 198 on the outward stroke of the piston. The free ends of the jaws 198 have locking latches 199 which are adapted to move into the path of and engage the outer surface of the disk 180 as shown in Fig. 14 of the drawings. The outer ends of the jaws 198 are tapered inwardly, as shown at 200, so that upon an inward movement of the disk 180 the jaws will swing outwardly to permit the disk to pass thereby. The other ends of the jaws 198 are provided with offset apertured bifurcated portions 201 through which bolts 202 and nuts 203 rigidly clamp and secure said jaws to the flattened outer ends 204 of two horizontally spaced apart shafts 205. The shafts 205 are oscillatably mounted in bores 206 in the flanges 185 of the head 154. The shafts 205 project into the housing 187 and are provided with enlarged diametral portions 207 and reduced inner ends 208 to which are rigidly secured laterally projecting cam levers 209 and 210. The cam levers 209 and 210 project toward one another and have their free ends curved to form cam surfaces 211 which are adapted to engage one another as shown in Fig. 22 of the drawings. Surrounding one of the shafts 207 is a torsional coiled spring 212 which has one of its ends 213 engaging one side of the switch housing 188. (See Fig. 20 of the drawings.) The other end of the spring 212 is provided with a hook 215 to engage in a recess 216 formed on one side of the cam lever 209. From the above description it will be understood that the spring 212 exerts a force to actuate the cam lever 209 in a direction inwardly. The cam 210 is actuated inwardly by the cam 209 through the contacting camming surfaces 211. (See Figs. 21 and 22 of the drawings.) This spring action, in turn, normally actuates the opposite jaws 198 inwardly into the path of movement of the disk 180 so that the disk 180 may be engaged by the latch portions 199 of the opposite jaws under certain circumstances hereinafter more fully described to frictionally slide or move the disk 180 on the rod 156 and control or vary the extent or predetermined range of operation of the fluid cylinder. The operation of the jaws 198 are controlled or actuated outwardly to disengage the jaws from the disks 180 by a solenoid generally indicated by the reference character 217. The solenoid 217 is of a conventional type and is mounted in a U-shaped bracket 218 and secured to the head 154 by screws 218ᵃ. Mounted in the solenoid 217 is the usual reciprocating member 219 which is provided with a reduced diametral extension 220. The extension 220 lies in the path of and is adapted to engage the inner edge of the recess 222 formed in the cam lever 210. (See Figs. 22 and 24 of the drawings.)

From the above description it will be seen that when the solenoid 217 is energized, the extension 220 will actuate the cam lever 210 against the action of the spring 212 to actuate the jaws 198 outwardly to release the disk 180 so that the disk is free to move with the rod 156.

A switch, generally indicated by the reference character 223, for controlling a secondary circuit, is also actuated by the solenoid 217. (See Figs. 20, 22 and 24 of the drawings.) This switch comprises a flat steel spring member 224 which has a right angularly bent end 225 riveted at 226 to an angle bracket 227. The bracket 227 is secured and grounded to one of the legs of the U-shaped bracket 218. The intermediate portion of flat member 224 has an aperture 228 which loosely embraces the extension 220 of the solenoid 217. (See Figs. 22 and 24 of the drawings.) The enlarged portion 219 is adapted to engage and actuate the member 224. The outer free end of the member 224 is provided with a contact member 229 which is adapted to engage a contact or terminal member 230 carried by and properly insulated from a bracket 231 secured to the head 154 by screw 232.

Welded to the outer end of the rod 156 is a U-shaped coupling 233 having aligned apertures therein for the reception of a pin 234 for pivotally connecting the rod end of the cylinder lug member 43 of the implement supporting structure. Suitable insulated wiring, generally indicated at 235, extends through an aperture 236 in the head 154 for serving the electrical apparatus in the casing 187. The details of this construction will hereinafter be more fully described in connection with the diagrammatic views in the drawings. The conduit 161 and wiring are secured to the shell 150 of the cylinder by suitable straps 237 and an angle bracket 238.

The electrical wiring system illustrated in the diagrammatic views shows the various electrical circuits, solenoids, switches, etc. whereby a finger tip control at the steering wheel column 29 of the tractor will afford a remote control for adjusting implements carried by or trailing the tractor. This mechanism will next be described.

In Fig. 25 of the drawings, I have shown a diagrammatic view of the two fluid power cylinders associated valve mechanism, the wire circuits and the electrical apparatus, in which the solenoid mechanism 126 consists of, in effect, two axially aligned separate solenoid coils 239 and 240. In the aligned bores of the coils 239 and 240 is a conventional reciprocal core or plunger 241 which is connected to the rod 125 for actuating the lever 116. The switch box on the steering column 29 is generally indicated by the reference character 242 and consists briefly of a conventional four-way hand switch lever 243 which is adapted to be operated to close the contact points 244 and 245 or points 246 and 247 or points 248 and 249 or points 250 and 251. In this connection it will be noted that a second switch box 243' is located below the first one and has identically the same type of lever 243' and corresponding switch contact points, all indicated by the same reference characters with the addition of a prime (') indicium. This second switch controls all of the No. II parts for No. II cylinder unit.

In Fig. 25 of the drawings, all the circuits are broken and all the solenoids are de-energized. In this position both cylinders and their respective pistons are contracted and locked so that the implements are in their lowered positions. In this position the fluid pressure flows from the pump 51 through the passageway 53 into the chambers 64, 65, 66, 67 and 68 surrounding the selector valve member 57, then through the passageways 128 to the passageway 129. From the passageway 129 the fluid pressure flows in to the chambers 64', 65', 66', 67' and 68' surrounding the selector valve 57 of the No. II cylinder unit. From here the fluid passes through the passageway 146 to the reservoir 133. At the same time the fluid pressure passing through the passageways 79 and 79ᵃ into the fluid chambers 78 and 77 balances the plunger 75 and holds it immovable so that the valve members 81 and 95 at the respective ends of the interlock valve remain seated and thereby locks the fluid cylinder unit No. I in the "down" or contracted position or the position shown in full lines in Fig. 1 of the drawings. The identical operation occurs in the selector and interlock valves 57' and 75' to lock fluid cylinder unit No. II.

A primary circuit includes a main wire 252 which is connected at one end to an ignition switch 253, a battery 255, the latter of which has one end grounded at 254ᵃ. The wire is connected to the adjacent end of the solenoids 239 and 240, as shown respectively at 259 and 258. One extension of the wire 252 terminates in the contact point 244 in the switch box 242. The complementary contact point 245 is connected by a wire 253' to one of the terminals of the solenoid 217. The other terminal of the solenoid 217 is connected by a wire 254 to one of the contact points of the switch 163. The other contact point of the switch 163 is grounded, as shown at 255. When the solenoid 217 is energized by the closing of the contact points 244 and 245 by the operation of the hand lever switch 243 on the switch box 242, the switch 223 closes a secondary circuit 256. The wire 256 is connected to the right hand end (as viewed in the diagrammatic views) of solenoid 240 as shown at 257. (See Fig. 26 of the drawings.) The closing of the secondary circuit 256 energizes the solenoid 240 which, in turn, actuates the member 241 to the right, as shown in Fig. 26. This, in turn, actuates the lever 116 about its pivot and shifts the selector valve 57 to the left, as viewed in this figure. With the selector valve 57 in this position, the fluid passes from the fluid pressure line 53 into the annular chamber 64, from here through the apertures 70 to the longitudinal bore 69 in the valve member 57. The fluid pressure then passes out through the apertures 71 to the annular chamber 67 into the passage 79a to the chamber 77 of the interlock valve. The fluid pressure in chamber 77 unseats the valve member 95 to permit the fluid to pass into the cyylinder end of the fluid cylinder No. I through the passageway 113 and hose connection 115 to force the piston 174 outwardly. (See Fig. 26 of the drawings.) At the same time, the fluid pressure in chamber 77 actuates the plunger 75 to the left and unseats the ball valve 81 so as to permit the fluid in the rod end of the cylinder to pass through the hose 92 and passageway 91 into the interlock valve chamber 78, then through passageway 79 to annular valve chambers 65 and 66 of the selector valve 57. From here the fluid passes through passageways 128 and 129 to annular chambers 64', 65', 66', 67' and 68' surrounding the selector valve member 57' of No. II cylinder unit. The fluid from the annular valve chamber surrounding selector valve 57' passes through the passageway 146 to the reservoir 133. It will be noted, at the same time, that the annular valve chambers 66' and 67' of selector valve 57' communicate with the respective chambers 77' and 78' through passageways 79' and 79'a, so that the fluid pressure is equalized in both sides of the plunger 75' and therefore the valves 81' and 95' of the interlock valve remain seated thereby locking or rendering fluid cylinder unit No. II immovable. In this connection it will be noted that all the electrical circuits of the No. II cylinder unit are broken, as shown in Fig. 26 of the drawings. It will be further noted that when the solenoid 217 is energized, the opposite jaws 198 are actuated outwardly to permit the disk 180 to move outwardly with the piston rod 156. When the piston reaches the outward end of its stroke, the bevelled portion 176 of the piston 174 will engage the switch trip member 166 to break the circuit 253' at switch 163 to de-energize the solenoid 217 and thereby also break the circuit 256 at switch 223. This, in turn, de-energizes the solenoid 240, permitting the selector valve 57 to return to neutral position (as shown in Fig. 25 of the drawings) by the action of the opposite springs 72, thereby locking cylinder unit No. I, in its extended position.

Through substantially the same or similar operations No. I fluid cylinder unit can be locked or rendered immovable while cylinder unit No. II can be extended. In this operation all the circuits for No. I cylinder unit are opened and the hand switch lever 243' on the switch box 242' is actuated to close the contact points 244' and 245' and through the substantially corresponding mechanisms, the operation of the cylinder units No. I and No. II are reversed. In other words, cylinder unit No. I is locked and cylinder unit No. II is raised.

In the diagrammatic view Fig. 27 No. I cylinder unit is lowering or contacting, while cylinder unit No. II is locked. In order to accomplish this operation, the circuits involved will first be described. The primary circuit 232 is connected, as shown at 259, to the inner end of the solenoid 239. The other end of the solenoid 239 is connected, as shown at 260, to a wire 261 of the circuit which, in turn, is connected to the contact point 250 of the switch box 242. The contact point 250 is connected to the contact point 249 by a connection 262. The contact point 248 is connected to a wire 263 which, in turn, is connected to one of the terminal ends of the switch 188. The other terminal of the switch 188 is grounded, as shown at 264. In order to lower or contract fluid cylinder unit No. I, the hand switch lever 243 on the steering column is moved to close the contact points 248 and 249 (at the same time it will be noted that switch 188 is automatically closed because the disk 180 is away from the trip pin 196 (see Figs. 15, 21 and 23 of the drawings) in this position of the piston rod of the cylinder), which, in turn, closes the circuit 252, 261 and 263 to energize the solenoid 239 and thereby actuate the solenoid member 241 to the left as viewed in Fig. 27 of the drawings. This, in turn, actuates the selector valve member 57 to the right (as viewed in this figure) through the lever 116. This causes the fluid to pass from the fluid pressure line 53 into the annular chambers 64 and 65, and from here through the passageway 79 into the chamber 78 to unseat the ball valve 81. From this chamber 78 the fluid is forced into the rod end of the cylinder No. I through the hose 92 to actuate the piston 174 inwardly to lower the implement. At the same time, the fluid pressure in the chamber 78 actuates the plunger 75 to the right (as viewed in Fig. 27) to unseat the ball valve 102 and permit the fluid in the piston end of the cylinder to flow through the hose 115, passageway 113, through the openings 108 in the sleeve 97 to the annular chamber 106. From here the fluid flows through the opposite openings 107 in the valve member 95 through and past the seat 101 into the chamber 77. From this chamber 77 the fluid passes through passageway 79a to the annular chambers 67 and 66 and then through passageway 128, 129 and 130 to annular chambers 64', 65', 66', 67' and 68' to passageway 146 to the reservoir 133. At the same time it will be noted that the fluid pressure in the chambers 77' and 78' on the opposite sides of the plunger 75' of No. II cylinder unit will be equalized by the passage of fluid through the respective passageways 79a' and 79' to these chambers. Under the circumstances, the ball valves 81' and 102' will remain seated, locking cylinder unit No. II in contracted position. In this connection it will be noted that all the circuits for cylinder unit No. II are broken.

When the piston 164 is forced inwardly in the cylinder 150, the preselection disk 180 moves in the path of and engages the trip pin 196 to break the circuits 263, 261 and 252 to de-energize the solenoid 139 and thereby return selector valve member 57 to neutral position. The breaking of the above circuits can occur whenever the disk 180 trips the pin 196 and since, as previously described, the disk 180 can be predeterminedly set on piston rod 156, the above circuits can be broken at various positions of contraction of the piston and cylinder. It will also be noted that the breaking of the above circuits always occurs when the disk 180 is between the jaws 198 and the end of the cylinder.

In a similar manner and by the operation of identical corresponding parts, cylinder unit No. II can be lowered or contracted from its extended position while cylinder unit No. I is locked or retained in any position.

In Fig. 28 of the drawings, both fluid cylinder units Nos. I and II are shown connected in series and both being extended to raise the implement on both sides of the tractor simultaneously. In this figure the disks 180 and 180' are shown as being held by the respective jaws 198 and 198' for a pre-selection setting for regulating the extent of the depth penetration of the soil working tools. The circuits which control this operation will next be described.

The contact point 246 of the switch box 242 is grounded as shown at 265. The contact point 247 is connected to the circuit 256 by an extension 266. In order to secure a pre-selection setting for both fluid cylinders, as above described, the contact points 246 and 247 are closed by the hand lever switch 243 for No. I cylinder unit. At the same time the contact points 246' and 247' are closed by the hand lever 243' for No. II cylinder unit. The closing of these circuits energizes the solenoids 240 and 240' and actuates the respective selector valve members 57 and 57' to the left (as viewed in Fig. 28 of the drawings) so that the fluid from the fluid pressure line 53 flows into the annular chamber 64 through the opposite apertures 70 through the longitudinal bore 69 of the valve member 57. From here it passes through the opposite apertures 71 to the annular chamber 67, and then through the passageway 79ᵃ to the fluid chamber 77 of the interlock valve. The fluid pressure in this chamber 77 unseats the valve 95 and permits the fluid pressure to pass into the piston end of the cylinder unit No. I through the hose connection 115 to actuate the piston 174 outwardly. At the same time the fluid pressure in chamber 77 actuates the plunger 75 to the left (as viewed in Fig. 28) to unseat the ball valve 81 and permit the fluid on the rod end of the cylinder to pass out through the hose connection 92 to the chamber 78 of the interlock valve. The fluid passes out from the chamber 78 through passageway 79 to annular chambers 65 and 66 and from there through passageways 128 and 129 to annular chambers 66' and 67' of selector valve 57'. From the chamber 67' the fluid passes through passageway 79ᵃ' to fluid chamber 77'. The fluid pressure in chamber 77' unseats valve member 95' and permits the fluid to flow into the piston end of cylinder unit No. II through the hose connection 115' to actuate the piston 174' of cylinder unit No. II outwardly. At the same time the pressure in the valve chamber 77' actuates the plunger 75' to unseat the ball valve member 81' and therefore permits the fluid in the rod end of cylinder unit No. II to pass out through the hose 92' through the chamber 78' through passageway 79' to the annular chamber 65'. From here the fluid is passed through the apertures 70' to the bore 69' and then through apertures 71' to annular chamber 68. From this last chamber the fluid passes through the passageway 146 to the reservoir 133.

It will be noted that both cylinders continue to extend simultaneously while the operator depresses both hand levers 243 and 243' to close the respective contact points 246—247 and 246'—247'. At the same time the jaws 198 and 198' will engage and hold the respective disks 180 and 180' so that both of these disks are moved to a different position or setting on their respective rods 156 and 156' until such time as the operator releases the respective hand levers 243 and 243' to automatically break respective circuits as above described. In this connection it will be noted that with this new setting or adjustment of the disks 180 and 180' to any points throughout the whole length of the respective rods, will thereafter provide an automatic control or preselection setting for the depth penetration of the soil tools until a new setting is made.

In Fig. 29 of the drawings, both fluid cylinder units Nos. I and II are shown connected in series and both cylinder units contracting or lowering the implements on the opposite sides of the tractor simultaneously. In this figure the disks 180 and 180' are in the process of adjustment on their respective rods 156 and 156' by engagement with the ends of the respective cylinder heads 154 and 154'. In this connection it will be noted that the operator may visually watch the depth penetration of the tools and then release the hand switch levers 243 and 243' to secure the desired setting of the disks 180 and 180' on the respective rods 156 and 156'. The circuits which control this operation will next be discussed.

The contact point 251 of switch box 242 is grounded, as shown at 267. In order to secure a pre-selection setting for both fluid cylinder units, as above described, the contact points 250—251 and 250'—251' are closed by the respective hand levers 243 and 243'. This closes the circuits 252—261 and 252'—261', energizing the respective solenoids 239 and 239'. The energized solenoids 239 and 239' actuate the respective selector valve members 57 and 57' to the right, as viewed in Fig. 29. As previously described, fluid pressure is diverted to the rod end of cylinder unit No. I and the fluid from piston end of cylinder unit No. I is diverted to the rod end of cylinder unit No. II. As previously described, the fluid from the piston end of cylinder unit No. II is diverted to the reservoir 133. In this connection it will be noted both cylinder units will continue to contract and move both disks 180 and 180' to different positions or setting on their respective rods 156 and 156' until such time as the operator releases the respective hand levers 243 and 243' to automatically break the respective circuits as previously described.

While the operation of the four way switch 242 and hand lever 243 is essential to the proper function of the electrical controls, the details of which have been omitted since other forms of conventional four-way switches may be employed. It is necessary to point out, for example, that the lever 243 moves in two right angular planes and may be set or self retained in two positions in one plane. In other words, the lever 243 may be self retained in positions closing contact points 244—245 or 248—249. However, from the contact points 248—249 the lever 243 can only be moved in the other plane to close contact points 246—247 or contact points 250—251. The lever 243 will automatically be returned from either contact points 246—247 or 250—251 to contact points 247—248 when the operator releases his grip on the hand lever 243. Since the other switch mechanism or lever 243' for the No. II cylinder unit is identical with the one above described, its function of operation is the same.

Another advantage of the present control is its wide range and accuracy of selectivity for the adjustment of the implements or implement parts and the ease with which these adjustments are accomplished.

Summarizing the advantages and functions of operation of my improved electrical control fluid operated mechanism, it will be observed that the following operations can be obtained:

(1) The fluid cylinder units are positively locked in all positions when all the selector valves are in neutral position or when all the electrical circuits are opened.

(2) Either one of the fluid cylinder units may be locked while the other is operating (raising or lowering).

(3) Both fluid cylinder units may be simultaneously raised or simultaneously lowered.

(4) One fluid cylinder unit may be raised while the other is being simultaneously lowered.

(5) The pre-selection disk for regulating the effective operation of one fluid cylinder unit may be adjusted on the operating cylinder unit (raising or lowering) while the other cylinder unit is locked.

(6) Both pre-selection disks may be simultaneously adjusted for predetermined setting while one fluid cylinder unit is being extended and the fluid cylinder unit is being simultaneously contracted.

(7) The adjustment of the pre-selection disks on and throughout the length of the piston rod permits an infinite number of adjustments throughout the stroke of the piston.

While in the above specification and drawings I have described and illustrated my fluid operated mechanism in connection with two fluid motors, it will, of course, be understood that the second fluid motor and its cooperating parts may be eliminated and a single fluid motor employed for remote operation and control for an implement located in trailing relation or otherwise connected to the tractor.

In the above specification I have described one embodiment of the invention, but it should be understood that many changes may be made in the construction, details and arrangements of the parts without departing from the spirit and scope of the present invention as expressed in the appended claims.

What I claim as my invention and desire to secure by Letters Patent is:

1. A power lift mechanism for tractors and the like having a source of fluid pressure comprising a housing unit including a valve mechanism mounted in said housing and connected to said source of fluid pressure, a fluid motor including a cylinder and a reciprocating piston and piston rod mounted in said cylinder, means for connecting the opposite ends of said cylinder with said valve mechanism, electrically controlled means operatively connected to said valve mechanism for actuating said valve mechanism and controlling the flow of fluid to and from said fluid motor, selectively adjustable means mounted on said piston rod, and means carried by said cylinder and selectively engageable with said adjustable means for holding said adjustable means on said piston rod in response to a predetermined movement of said piston rod.

2. A power lift mechanism for tractors and the like having a source of fluid pressure comprising a housing unit mounted on said tractor and including a valve mechanism mounted in said housing and communicating with the source of fluid pressure, a fluid motor remote from said valve mechanism including a cylinder and a reciprocating piston and piston rod mounted in said cylinder, conduits connecting the opposite ends of said cylinder with said valve mechanism, electrically controlled means operatively connected to said valve mechanism for actuating said valve mechanism and controlling the flow of fluid to and from said fluid motor, selectively adjustable means mounted on said piston rod, and means carried by said cylinder and selectively engageable with said adjustable means for holding said adjustable means on said piston rod in response to a predetermined movement of said piston rod.

3. A fluid operated device comprising a housing, a valve mechanism mounted in said housing and connected to a source of fluid pressure, a fluid motor including a cylinder, a reciprocating piston and piston rod, conduits connecting the opposite ends of said cylinder with said valve mechanism, a solenoid operatively connected to said valve mechanism, an electrical circuit connected to a source of electrical energy and to said solenoid for energizing said solenoid, a switch for closing said circuit for energizing said solenoid and actuating said valve mechanism, means including a tripper mounted on said cylinder for controlling said valve mechanism, an adjustable means mounted on and movable with respect to said piston rod, means carried by said cylinder and selectively engageable with said adjustable means for holding said adjustable means in response to a predetermined movement of said piston rod, said adjustable means being engageable with said tripper for controlling said valve.

4. Control mechanism for a fluid operated device that includes a piston, a piston rod and a cylinder unit connected to a part to be actuated, said mechanism including a valve casing, a valve member mounted in said valve casing, said valve casing having port openings communicating with the opposite ends of said cylinder, a solenoid positioned adjacent said valve member, means for operatively connecting said solenoid with said valve member, an electrical circuit connected to a source of electrical energy and connected to said solenoid, a hand switch connected in said circuit for closing said circuit and energizing said solenoid, switch means mounted on said cylinder and connected in said circuit for controlling the energization of said solenoid, selectively movable means mounted on said piston rod and engageable with said switch means, and means engageable with said selectively movable means for adjusting said last named means on said piston rod in response to the movement of said piston rod.

5. A stroke control means for a fluid motor comprising a cylinder and a piston having a piston rod, valve means for controlling the fluid flow to and from said cylinder to actuate said piston rod, movable means mounted on said cylinder, means frictionally engaging said piston rod for actuating said movable means, means carried by said cylinder and selectively engageable with said frictional engaging means for adjusting said frictional engaging means on said piston rod in response to a predetermined movement of said piston rod, and means responsive to the actuation of said movable means for closing said valve means to stop said piston rod.

6. A stroke control means for a fluid motor comprising a cylinder and a piston having a piston rod, valve means for controlling the fluid flow to and from said cylinder to actuate said piston rod, movable means mounted on said cylinder, means frictionally engaging said piston rod for actuating said movable means in response to a predetermined movement of said rod into said cylinder, means responsive to the actuation of said movable means for closing said valve means to stop said piston rod, and a selectively controlled means including an energizable magnetic element operatively related to said frictional means for selectively holding said frictional means despite the frictional drag of said piston rod during the outward movement thereof.

7. Control mechanism for a fluid operated device that includes a piston and cylinder unit connected with a part to be actuated, said mechanism including a valve casing, a valve member mounted in said casing, said valve casing having port openings communicating with the opposite ends of said cylinder, a solenoid positioned adjacent said valve member, means for operatively connecting said solenoid with said valve member, an electrical circuit connected to a source of electrical energy and connected to said solenoid, a second solenoid connected in said circuit, a second electrical circuit, a switch in said second circuit, means for operatively connecting said second switch to the second solenoid, an adjustable preselection member associated and movable with said piston, holding means carried by said cylinder and adapted to engage said preselection member for adjusting said member with respect to said piston, and means for operatively connecting said holding means with said second named solenoid.

8. Control mechanism for a fluid operated device that includes a piston and cylinder unit connected with a part to be actuated, said mechanism including a valve casing, a valve member mounted in said casing, said valve casing having port openings communicating with the opposite ends of said cylinder, a solenoid positioned adjacent said valve member, means for operatively connecting said solenoid with said valve member, an electrical circuit connected to a source of electrical energy and connected to said solenoid, a second solenoid connected in said circuit, a second electrical circuit, a switch in said second circuit, means for operatively connecting said second switch to the second solenoid, an adjustable preselection member associated and movable with said piston, holding means carried by said cylinder and adapted to engage said preselection member for adjusting said member with respect to said piston, means for operatively connecting said holding means with said second named solenoid, and spring actuated means for normally actuating said holding means into the path of movement of said preselection member.

9. Control mechanism for a fluid operated device that includes a piston, piston rod and cylinder unit connected with a part to be actuated, said mechanism including a valve casing, a valve member mounted in said casing, said valve casing having port openings therein communicating with the opposite ends of said cylinder, a solenoid positioned adjacent said valve member, means for operatively connecting said solenoid with said valve member for controlling the flow of fluid to and from the opposite ends of said cylinder, an electrical circuit connected to a source of electrical energy and connected to said solenoid, a hand switch connected in said circuit to open or close said circuit, a second solenoid connected in said circuit, a reciprocal core mounted in the second solenoid, a second circuit having one terminal connected to said first solenoid, a switch connected in said second circuit, means for operatively connecting said last named switch to said core, an adjustable preselection member movably mounted on said piston rod, oppositely disposed jaws movably mounted on said cylinder and engageable with said member for holding said member during the outward movement of said piston, and operative connections between said jaws and said core for actuating said jaws outwardly to release said preselection member when said second solenoid is energized.

10. Control mechanism for a fluid operated device that includes a piston, piston rod and cylinder unit connected with a part to be actuated, said mechanism including a valve casing, a valve member mounted in said casing, said valve casing having port openings therein communicating with the opposite ends of said cylinder, a solenoid positioned adjacent said valve member, means for operatively connecting said solenoid with said valve member for controlling the flow of fluid to and from the opposite ends of said cylinder, an electrical circuit connected to a source of electrical energy and connected to said solenoid, a hand switch connected in said circuit to open or close said circuit, a second solenoid connected in said circuit, a reciprocal core mounted in the second solenoid, a second circuit having one terminal connected to said first solenoid, a switch connected in said second circuit, means for operatively connecting said last named switch to said core, an adjustable preselection member movably mounted on said piston rod, oppositely disposed jaws movably mounted on said cylinder and engageable with said member for holding said member during the outward movement of said piston, operative connections between said jaws and said core for actuating said jaws outwardly to release said preselection member when said second solenoid is energized, and spring operative means connected with said jaws for normally actuating said jaws into the path of movement of said member.

11. Control mechanism for a fluid operated device that includes a piston, piston rod and cylinder unit connected with a part to be actuated, said mechanism including a valve casing, a valve member mounted in said casing, said valve casing having port openings therein communicating with the opposite ends of said cylinder, a solenoid positioned adjacent said valve member, means for operatively connecting said solenoid with said valve member for controlling the flow of fluid to and from the opposite ends of said cylinder, an electrical circuit connected to a source of electrical energy and connected to said solenoid, a hand switch connected in said circuit to open or close said circuit, a second solenoid connected in said circuit, a reciprocal core mounted in the second solenoid, a second circuit having one terminal connected to said first solenoid, a switch connected in said second circuit, means for operatively connecting said last named switch to said core, an adjustable preselection member movably mounted on said piston rod, oppositely disposed jaws movably mounted on said cylinder and engageable with said member for holding said member during the outward movement of said piston, operative connections between said jaws and said core for actuating said jaws outwardly to release said preselection member when said second solenoid is energized, and an automatically actuated switch connected in the first named circuit and carried by said cylinder and actuated by said piston to break both circuits and de-energize both solenoids.

12. Control mechanism for a fluid operated device that includes a piston, piston rod and cylinder unit connected with a part to be actuated, said mechanism including a valve casing, a valve member mounted in said casing, said valve casing having port openings therein communicating with the opposite ends of said cylinder, a solenoid positioned adjacent said valve member, means for operatively connecting said solenoid with said valve member for controlling the flow of fluid to and from the opposite ends of said cylinder, an electrical circuit connected to a source of electrical energy and connected to said solenoid, a hand switch connected in said circuit to open or close said circuit, a second solenoid connected in said circuit, a reciprocal core mounted in the second solenoid, a second circuit having one terminal connected to said first solenoid, a switch connected in said second circuit, means for operatively connecting said last named switch to said core, an adjustable preselection member movably mounted on said piston rod, oppositely disposed jaws movably mounted on said cylinder and engageable with said member for holding said member during the outward movement of said piston, operative connections between said jaws and said core for actuating said jaws outwardly to release said preselection member when said second solenoid is energized, a switch connected in said first named circuit and mounted on said cylinder adjacent one end thereof, a member operatively connected to one of the contact points of said last named switch, and means carried by said piston and engageable with said last named member to break both circuits and de-energize both solenoids.

13. Control mechanism for a fluid operated device that includes a piston, piston rod and cylinder unit connected with a part to be actuated, said mechanism including a valve casing, a valve member mounted in said casing, said valve casing having port openings therein communicating with the opposite ends of said cylinder, a solenoid positioned adjacent said valve member, means for operatively connecting said solenoid with said valve member for controlling the flow of fluid to and from the opposite ends of said cylinder, an electrical circuit connected to a source of electrical energy and connected to said solenoid, a hand switch connected in said circuit to open or close said circuit, a second solenoid connected in said circuit, a reciprocal core mounted in the second solenoid, a second circuit having one terminal connected to said first solenoid, a switch connected in said second circuit, means for operatively connecting said last named switch to said core, an adjustable preselection member movably mounted on said piston rod, oppositely disposed jaws movably mounted on said cylinder and engageable with said member for holding said member during the outward movement of said piston, operative connections between said jaws and said core for actuating said jaws outwardly to release said preselection member when said second solenoid is energized, an automatically actuated switch connected in the first named circuit and carried by said cylinder and actuated by said piston to break both circuits and deenergize both solenoids, and spring means operatively connected with said jaws for normally actuating said jaws into the path of movement of said preselection member.

14. A stroke adjusting means for a fluid motor comprising a cylinder and a piston having a piston rod projecting from said cylinder, valve means for controlling the fluid flow to and from said cylinder to actuate said piston rod, a preselection member frictionally mounted on and adjustable along said piston rod, and means mounted on said cylinder and selectively engageable with said preselection member for adjusting said preselection member on said piston rod in response to a predetermined movement of said piston rod, said preselection member being operatively related to said valve means for closing said valve means to stop said piston rod.

15. A stroke adjusting means for a fluid motor comprising a cylinder and a piston having a piston rod projecting from said cylinder, valve means for controlling the fluid flow to and from said cylinder to actuate said piston rod, means including a tripper member mounted on said cylinder for controlling said valve means, and an adjustable preselection member supported on and movable with respect to said piston rod, means carried by said cylinder and selectively engageable with said preselection member for adjusting said preselection member in response to a predetermined movement of said piston rod, said preselection member being movable in the path of and engageable with the tripper member to actuate said valve means to stop said piston rod.

16. A stroke adjusting means for a fluid motor comprising a cylinder and a piston having a piston rod projecting from said cylinder, valve means for controlling the fluid flow to and from said cylinder to actuate said piston rod, means including a tripper member mounted on said cylinder for controlling said valve means, an adjustable preselection member supported on and movable with respect to said piston rod in response to a predetermined movement of said piston rod, said preselection member being movable in the path of and engageable with the tripper member to actuate said valve means to stop said piston rod, and a selectively controlled means including an energizable magnetic means operatively related to said preselection member for selectively holding and adjusting said preselection member with respect to said piston rod.

17. A fluid power lift mechanism for tractors having a source of fluid pressure, a valve casing having a bore therein and a fluid pressure inlet port and a fluid outlet port communicating with said bore, a casing having two spaced apart fluid passage ports spaced from said first named ports and communicating with said bore, there being separate annular fluid chambers in said casing surrounding and communicating with said bore and communicating respectively with each of the respective ports, a reciprocable selector valve member mounted in said bore having spaced apart diametral openings therein communicating with a longitudinal bore in said valve member, spaced apart lands formed on said valve member for controlling the communication between certain of said annular fluid chambers, an interlock valve mechanism including a plunger mounted in a second bore in said casing, there being interlock fluid chambers at points adjacent the ends of said bore and on the opposite sides of said plunger communicating with the fluid passage ports of said casing, a fluid motor including a cylinder, piston and piston rod, conduits connecting the respective opposite ends of said cylinder with the chambers on the opposite sides of said plunger, interlock valve members located in said interlock valve chambers and responsive to the differentiation of fluid pressure in said interlock chambers to unseat said interlock valve members and control the flow of fluid to and from the opposite ends of said cylinder, a solenoid operatively connected to said selector valve member, an electrical circuit connected to a source of electrical energy and to said solenoid for energizing said solenoid, a hand switch in said circuit for controlling the energization of said solenoid and actuation of said valve mechanism, a second solenoid connected in said circuit, a second electrical circuit, a switch in said second circuit, means for operatively connecting said second solenoid to said second switch, an adjustable preselection member mounted on said piston rod, holding means carried by and adapted to engage said preselection member for adjusting said member on said piston rod, and means for operatively connecting said holding means to said second solenoid.

18. A fluid power lift mechanism for tractors having a source of fluid pressure, a valve casing having a bore therein and a fluid pressure inlet port and a fluid outlet port communicating with said bore, a casing having two spaced apart fluid passage ports spaced from said first named ports and communicating with said bore, there being separate annular fluid chambers in said casing surrounding and communicating with said bore and communicating respectively with each of the respective ports, a reciprocable selector valve member mounted in said bore having spaced apart diametral openings therein communicating with a longitudinal bore in said valve member, spaced apart lands formed on said valve member for controlling the communication between certain of said annular fluid chambers, an interlock valve mechanism including a plunger mounted in a second bore in said casing, there being interlock fluid chambers at points adjacent the ends of said bore and on the opposite sides of said plunger communicating with the fluid passage ports of said casing, a fluid motor including a cylinder, piston and piston rod, conduits connecting the respective opposite ends of said cylinder with the chambers on the opposite sides of said plunger, interlock valve members located in said interlock valve chambers and responsive to the differentiation of fluid pressure in said interlock chambers to unseat said interlock valve members and control the flow of fluid to and from the opposite ends of said cylinder, a solenoid operatively connected to said selector valve member, an electrical circuit connected to a source of electrical energy and to said solenoid for energizing said solenoid, a hand switch in said circuit for controlling the energization of said solenoid and actuation of said valve mechanism, a second solenoid connected in said circuit, a second electrical circuit, a switch in said second circuit, means for operatively connecting said second solenoid to said second switch, an adjustable preselection member mounted on said piston rod, holding means carried by and adapted to engage said preselection member for adjusting said member in said piston rod, means for operatively connecting said holding means to said second solenoid, and spring actuated means for normally actuating said holding means into the path of movement of said preselection member.

19. A fluid power lift mechanism for tractors having a source of fluid pressure, a valve casing having a bore therein and a fluid pressure inlet port and a fluid outlet port communicating with said bore, said casing having two spaced apart fluid passage ports spaced from said first named ports and communicating with said bore, there being separate annular fluid chambers in said casing surrounding and communicating with said bore and communicating respectively with each of the respective ports, a reciprocable selector valve member mounted in said bore having spaced apart diametral openings therein communicating with a longitudinal bore in said valve member, spaced apart lands formed on said valve member for controlling the communication between certain of said annular fluid chambers, an interlock valve mechanism including a plunger mounted in a second bore in said casing, there being interlock fluid chambers at points adjacent the ends of said bore and on the opposite sides of said plunger communicating with the fluid passage ports of said casing, a fluid motor including a cylinder, piston and piston rod, conduits connecting the respective opposite ends of said cylinder with the chambers on the opposite sides of said plunger, interlock valve members located in said interlock valve chambers and responsive to the differentiation of fluid pressure in said interlock chambers to unseat said interlock valve members and control the flow of fluid to and from the opposite ends of said cylinder, a solenoid operatively connected to said selector valve member, an electrical circuit connected to a source of electrical energy and to said solenoid for energizing said solenoid, a hand switch in said circuit for controlling the energization of said solenoid and actuation of said valve mechanism, a second solenoid connected in said circuit, a second electrical circuit, a switch connected in said second circuit, means for operatively connecting said second solenoid to said second switch, an adjustable preselection member mounted on said piston rod, oppositely disposed members movably mounted on said cylinder and engageable with said preselection member and actuated by said second solenoid for adjusting said preselection member on said piston rod.

20. A fluid power lift mechanism for tractors having a source of fluid pressure, a valve casing having a bore therein and a fluid pressure inlet port and a fluid outlet port communicating with said bore, said casing having two spaced apart fluid passage ports spaced from said first named ports and communicating with said bore, there being separate annular fluid chambers in said casing surrounding and communicating with said bore and communicating respectively with each of the respective ports, a reciprocable selector valve member mounted in said bore having spaced apart diametral openings therein communicating with a longitudinal bore in said valve member, spaced apart lands formed on said valve member for controlling the communication between certain of said annular fluid chambers, an interlock valve mechanism including a plunger mounted in a second bore in said casing, there being interlock fluid chambers at points adjacent the ends of said bore and on the opposite sides of said plunger communicating with the fluid passage ports of said casing, a fluid motor including a cylinder, piston and piston rod, conduits connecting the respective opposite ends of said cylinder with the chambers on the opposite sides of said plunger, interlock valve members located in said interlock valve chambers and responsive to the differentiation of fluid pressure in said interlock chambers to unseat said interlock valve members and control the flow of fluid to and from the opposite ends of said cylinder, a solenoid operatively connected to said selector valve member, an electrical circuit connected to a source of electrical energy and to said solenoid for energizing said solenoid, a hand switch in said circuit for controlling the energization of said solenoid and actuation of said valve mechanism, a second switch connected in said circuit, a preselection member mounted in said piston rod and movable in the path of said second switch to break said circuit, and means associated with said cylinder and engageable with said preselection member for adjusting said preselection member on said piston rod.

21. A fluid power lift mechanism for tractors having a source of fluid pressure, two valve blocks having selector valve bores therein and fluid pressure inlet ports and fluid outlet ports communicating with the respective bores, each of said blocks having two spaced apart fluid passage ports spaced from the first named ports and communicating with the respective bores, there being separate annular fluid chambers in each of said blocks surrounding and communicating each of the respective bores and communicating with certain of said ports, a reciprocable selector valve member mounted in each of said bores and having spaced apart diametral openings therein communicating with a longitudinal bore in each of said valve members, spaced apart lands formed on said valve members for controlling the communication between certain of the annular chambers, interlock valve mechanism for each of said selector valves including plungers mounted in separate bores in said blocks, there being interlock fluid chambers in each of said bores at points adjacent the ends of said bores on the opposite sides of each of said plungers communicating with the fluid passage ports of each of said blocks, two separate fluid motors, each including a cylinder and a piston, conduits connecting the opposite ends of each of said cylinders with the respective interlock fluid chambers, and interlock valve members mounted in said interlock chambers and adapted to be engaged by the respective plungers for controlling the flow of fluid to the respective fluid motors, there being passageways in each of said blocks connecting and communicating certain of the annular chambers of one selector valve with a corresponding chamber of the other selector valve whereby the actuation of said fluid motors may be separately or simultaneously actuated.

22. A fluid power lift mechanism for tractors having a source of fluid pressure, two valve blocks having selector valve bores therein and fluid pressure inlet ports and fluid outlet ports communicating with the respective bores, each of said blocks having two spaced apart fluid passage ports spaced from the first named ports and communicating with the respective bores, there being separate annular fluid chambers in each of said blocks surrounding and communicating each of the respective bores and communicating with certain of said ports, a reciprocable selector valve member mounted in each of said bores and having spaced apart diametral openings therein communicating with a longitudinal bore in each of said valve members, spaced apart lands formed on said valve members for controlling the communication between certain of the annular chambers, interlock valve mechanism for each of said selector valves including plungers mounted in separate bores in said blocks, there being interlock fluid chambers in each of said bores at points adjacent the end of said bores on the opposite sides of each of said plungers communicating with the fluid passage ports of each of said blocks, two separate fluid motors, each including a cylinder and a piston, conduits connecting the opposite end of each of said cylinders with the respective interlock fluid chambers, interlock valve members mounted in said interlock chambers and adapted to be engaged by the respective plungers for controlling the flow of fluid to the respective fluid motors, there being passageways in each of said blocks connecting and communicating certain of the annular chambers of one selector valve with a corresponding chamber of the other selector valve whereby the actuation of said fluid motors may be separately or simultaneously actuated, a separate solenoid mounted on each of said blocks and operatively connected to the respective selector valve members, separate electrical circuits connected to a source of electrical energy and connected respectively to each of said solenoids, and separated switches in each of said circuits for controlling said circuits.

References Cited in the file of this patent

UNITED STATES PATENTS

| | | |
|---|---|---|
| 610,479 | Ewart | Sept. 6, 1898 |
| 1,147,820 | Scott | July 27, 1915 |
| 1,635,873 | Woolson | July 12, 1927 |
| 1,955,154 | Temple | Apr. 17, 1934 |
| 2,021,066 | Huxford | Nov. 12, 1935 |
| 2,160,596 | Lebleu | May 30, 1939 |
| 2,219,896 | Harrington et al. | Oct. 29, 1940 |
| 2,232,357 | Argo | Feb. 18, 1941 |
| 2,234,019 | Bragg | Mar. 4, 1941 |
| 2,247,141 | Twyman | June 24, 1941 |
| 2,324,635 | Meyer | July 20, 1943 |
| 2,363,111 | Bennett | Nov. 21, 1944 |
| 2,379,536 | Mackenzie | July 3, 1945 |
| 2,380,510 | Fitch | July 31, 1945 |
| 2,460,477 | Wallman | Feb. 1, 1949 |
| 2,506,008 | Arps | May 2, 1950 |
| 2,545,573 | Fletcher | Mar. 20, 1951 |
| 2,554,930 | Ulinski | May 29, 1951 |
| 2,574,096 | Fischer | Nov. 6, 1951 |
| 2,575,507 | Acton | Nov. 20, 1951 |
| 2,604,075 | Naud | July 22, 1952 |
| 2,678,638 | Bopp | May 18, 1954 |

FOREIGN PATENTS

| | | |
|---|---|---|
| 747,960 | France | Apr. 4, 1933 |
| 523,600 | Great Britain | July 18, 1940 |